United States Patent
Kokotov et al.

(10) Patent No.: US 10,190,188 B2
(45) Date of Patent: Jan. 29, 2019

(54) MIXING METHOD AND DEVICE FOR SOLVENT EXTRACTION, ESPECIALLY IN HYDROMETALLURGICAL PROCESSES

(71) Applicant: Turbulent Technologies Ltd., Haifa (IL)

(72) Inventors: Yuri Kokotov, MaAle Adumim (IL); Leonid Braginsky, MaAle Adumim (IL); Roman Sheinman, Kfar-Saba (IL)

(73) Assignee: TURBULENT TECHNOLOGIES LTD., Haifa (IL)

( * ) Notice: Subject to any disclaimer, the term of this patent is extended or adjusted under 35 U.S.C. 154(b) by 560 days.

(21) Appl. No.: 14/647,115

(22) PCT Filed: Nov. 25, 2013

(86) PCT No.: PCT/IL2013/050970
§ 371 (c)(1),
(2) Date: May 25, 2015

(87) PCT Pub. No.: WO2014/080408
PCT Pub. Date: May 30, 2014

(65) Prior Publication Data
US 2015/0299821 A1    Oct. 22, 2015

Related U.S. Application Data

(60) Provisional application No. 61/729,658, filed on Nov. 26, 2012, provisional application No. 61/729,616, filed on Nov. 25, 2012.

(51) Int. Cl.
*C22B 3/22* (2006.01)
*B01D 11/04* (2006.01)
(Continued)

(52) U.S. Cl.
CPC ............ *C22B 3/22* (2013.01); *B01D 11/04* (2013.01); *B01D 11/0457* (2013.01);
(Continued)

(58) Field of Classification Search
CPC .. C22B 3/22; C22B 3/02; C22B 15/00; C22B 15/0065; C22B 15/0082; C22B 15/0084;
(Continued)

(56) References Cited

U.S. PATENT DOCUMENTS 2,405,158 A * 8/1946 Mensing ............ B01D 11/0457
                                                    210/194
2,855,156 A * 10/1958 Bosse ........................ B01F 7/16
                                                    106/253
(Continued)

FOREIGN PATENT DOCUMENTS

CL            57-10        1/2010
CL          1696-11        7/2011
(Continued)

OTHER PUBLICATIONS

Translation of Written Opinion dated Nov. 14, 2016 From the Instituto Nacional de Propiedad Industrial de Chile, INAPI Re. Application No. 201501348. (9 Pages).
(Continued)

*Primary Examiner* — Joseph W Drodge
(74) *Attorney, Agent, or Firm* — Marc Van Dyke; Fourth Dimension IP

(57) ABSTRACT

A system and method are disclosed for mixing a suspension. The suspension may optionally have a low liquid viscosity. The suspension may, optionally, include a metallurgy solvent extraction (SX) mixture. The system and method may be at an industrial scale. In some embodiments, suspension may be stirred at high energy dissipation rate with a large impeller. The system may optionally include baffles. The
(Continued)

impellor and/or the baffles may optionally include a rounded edge. The method may be applied to retrofitting a SX plant. The input feed to a mixing reactor may include an emulsion and/or multiple discrete phases.

8 Claims, 13 Drawing Sheets

(51) Int. Cl.
*B01F 7/16* (2006.01)
*B01F 15/00* (2006.01)
*B01J 19/18* (2006.01)
*B01F 7/00* (2006.01)
*B01F 3/08* (2006.01)
*C22B 3/02* (2006.01)

(52) U.S. Cl.
CPC .......... *B01F 3/0853* (2013.01); *B01F 7/0015* (2013.01); *B01F 7/00133* (2013.01); *B01F 7/00466* (2013.01); *B01F 7/00633* (2013.01); *B01F 7/16* (2013.01); *B01F 7/1675* (2013.01); *B01F 15/00253* (2013.01); *B01J 19/18* (2013.01); *C22B 3/02* (2013.01)

(58) Field of Classification Search
CPC .... C22B 15/0086; B01F 7/16; B01F 7/00133; B01F 7/00141; B01F 7/0015; B01F 7/00158; B01F 7/00466; B01F 7/00633; B01F 7/1635; B01F 7/1645; B01F 7/1675; B01F 15/00253; B01F 15/00363; B01F 15/00376; B01F 15/00383; B01F 15/00402; B01F 15/00409; B01F 3/0853; B01F 3/0857; B01F 3/0861; B01F 3/12; B01F 3/1207; B01F 3/1221; B01F 7/00; B01F 7/00108; B01F 7/00116; B01F 7/00125; B01F 3/08; B01D 11/04; B01D 11/0457; B01D 11/02; B01D 11/0257; B01J 19/18; B01J 19/1806
USPC ................ 210/634, 639, 511; 422/256–259; 423/24, 27, 658.5; 366/279, 282, 292, 366/297, 348
See application file for complete search history.

(56) References Cited

U.S. PATENT DOCUMENTS

| | | | | |
|---|---|---|---|---|
| 2,964,301 A * | 12/1960 | Bosse | .................... | B01F 7/0015 366/329.3 |
| 3,489,526 A * | 1/1970 | Rafael | ................ | B01D 11/0457 422/115 |
| 3,529,011 A * | 9/1970 | John | ........................ | B01J 21/16 422/615 |
| 4,046,559 A * | 9/1977 | Crimes | .................. | B01F 3/0853 366/286 |
| 4,391,711 A * | 7/1983 | Jackson | ............. | B01D 11/0453 210/511 |
| 4,747,694 A | 5/1988 | Nyman et al. | | |
| 4,844,801 A | 7/1989 | Szanto | | |
| 4,884,894 A | 12/1989 | Hashimoto et al. | | |
| 5,185,081 A | 2/1993 | Nyman et al. | | |
| 5,226,727 A | 7/1993 | Reichner | | |
| 6,321,998 B1 * | 11/2001 | Schubert | ................ | B01F 5/0256 239/430 |
| 6,413,429 B1 | 7/2002 | Breman et al. | | |
| 6,523,995 B2 | 2/2003 | Fasano et al. | | |
| 2003/0152500 A1 | 8/2003 | Dalziel et al. | | |
| 2004/0132836 A1* | 7/2004 | Font Freide | ............. | B01J 8/228 518/726 |
| 2005/0007874 A1* | 1/2005 | Roszczenko | ........ | B01F 3/04248 366/270 |
| 2007/0044824 A1 | 3/2007 | Capeci et al. | | |
| 2008/0226513 A1* | 9/2008 | Morbidelli | .............. | B01F 7/008 422/135 |
| 2010/0176063 A1 | 7/2010 | Kokotov et al. | | |
| 2011/0070639 A1* | 3/2011 | Pandit | ................... | B01F 5/0682 435/306.1 |
| 2012/0045376 A1* | 2/2012 | Roberge | ............... | B01J 19/0093 422/600 |

FOREIGN PATENT DOCUMENTS

| | | |
|---|---|---|
| EP | 1566208 | 8/2005 |
| EP | 2327472 | 6/2011 |
| GB | 1087198 | 10/1967 |
| WO | WO 2014/080408 | 5/2014 |

OTHER PUBLICATIONS

Search Report and Written Opinion dated Nov. 14, 2016 From the Instituto Nacional de Propiedad Industrial de Chile, INAPI Re. Application No. 201501348. (8 Pages).
Communication Relating to the Results of the Partial International Search dated Mar. 7, 2014 From the International Searching Authority Re. Application No. PCT/IL2013/050970.
International Preliminary Report on Patentability dated Jun. 4, 2015 From the International Bureau of WIPO Re. Application No. PCT/IL2013/050970.
International Search Report and the Written Opinion dated May 20, 2014 From the International Searching Authority Re. Application No. PCT/IL2013/050970.
Kuusisto et al. "Outokumpu SX EW Technology Package", The Third South African Conference on Base Metals: Southern Africa's Response to Changing Global Base Metals Market Dynamics, Kitwe, Zambia, Jun. 26-29, 2005, p. 321-336, 2005.

* cited by examiner

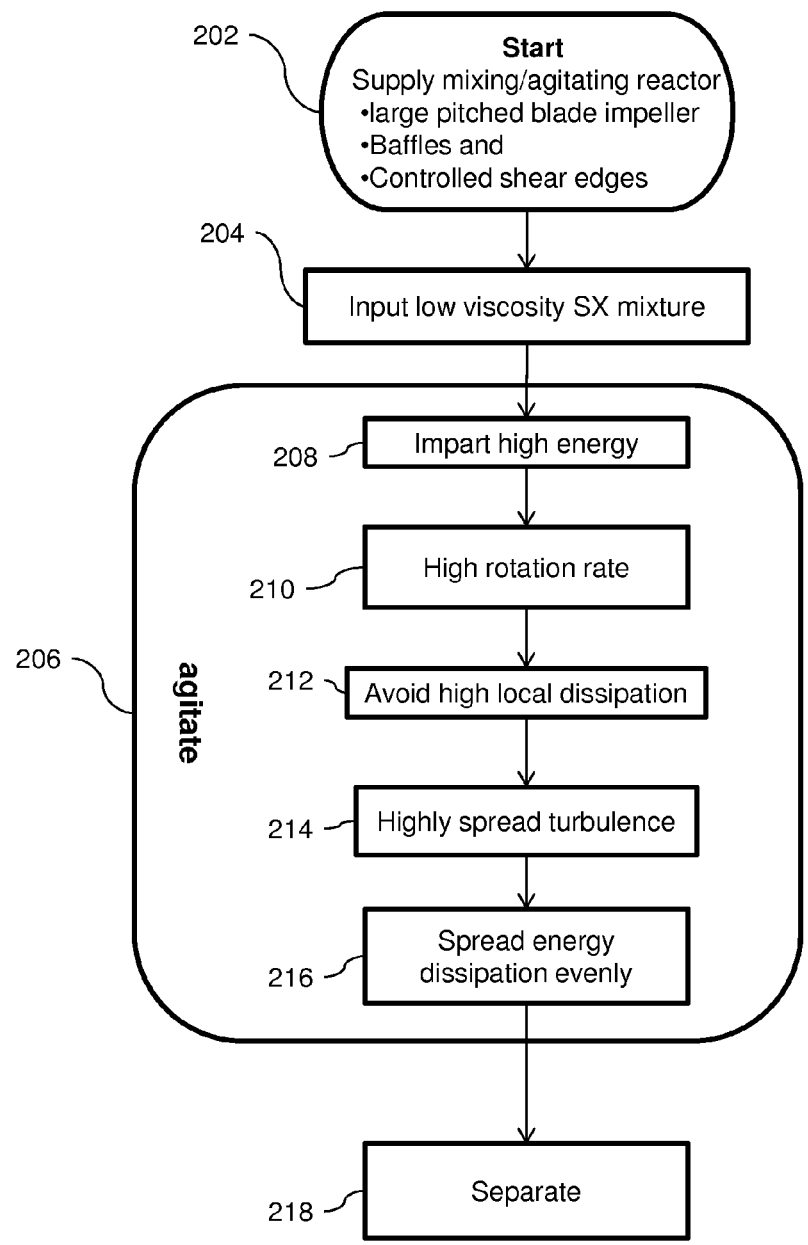

US 10,190,188 B2

MIXING METHOD AND DEVICE FOR SOLVENT EXTRACTION, ESPECIALLY IN HYDROMETALLURGICAL PROCESSES

RELATED APPLICATIONS

This application is a National Phase of PCT Patent Application No. PCT/IL2013/050970 having International filing date of Nov. 25, 2013, which claims the benefit of priority under 35 USC § 119(e) of U.S. Provisional Patent Application Nos. 61/729,658 filed on Nov. 26, 2012 and 61/729,616 filed on Nov. 25, 2012. The contents of the above applications are all incorporated by reference as if fully set forth herein in their entirety.

FIELD AND BACKGROUND OF THE INVENTION

The present invention, in some embodiments thereof, relates to a method and system for mixing a fluid and, more particularly, but not exclusively, to a system and method to mix a low viscosity mixture of two immiscible liquids that, in some embodiments, may achieve high mass transfer rate and separability.

United States Patent Application 2007/0044824 to Capeci et al. discloses a processing system, a method of processing and products produced by said process. Such system and method can reduce change over time and/or of product quality.

United States Patent Application 2003/0152500 to Dalziel et al. discloses a high intensity, in-line rotor-stator apparatus to produce fine particles via antisolvent, reactive, salting out or rapid cooling precipitation and crystallization.

U.S. Pat. No. 4,884,894 discloses a fluid mixing element in which at least one helical shaft provided with at least one helical groove on an outer peripheral wall thereof throughout its length. The mixing element is inserted in a cylindrical passage tube provided with at least one helical groove on an inner peripheral wall thereof throughout its length. According to the mixing element of the invention, the fluid supplied into the mixing element flows partly along the helical groove formed in the passage tube and partly along the helical groove formed on the helical shaft to produce the turbulent mixing of the fluid in the mixing element. When the fluid flows through the helical grooves formed in the passage tube and on the helical shaft of the mixing element, the phase transfer is also carried out at planes perpendicular to the flow direction by inertia of the fluid. Accordingly, the fluid in contact with the helical grooves and the fluid out of contact therewith are replaced with each other in series. The mixing is further effected by division of the fluid in series at each of many contact portions of the passage tube and the helical shaft.

United States Patent Application 2010/0176063 to Kokotov et al. discloses a method and apparatus for separating immiscible liquids. Such method and apparatus may allow coalescing of relatively small-sized droplets into larger droplets for easing and improving the degree of separation thereafter. The method may be defined by a system of equations describing the requirements and conditions imposed on the kinetics of droplet breaking and coalescence as functions of properties of the involved liquids, involved energy, and means for inducing mixing energy into the mixture. According to the method, such means may include viscosity, interfacial tension, droplet diameter distribution, average droplet diameter, average volumetric droplet diameter, concentration of the dispersed liquid in the coalescing apparatus, restricting pressure of the electrostatic double layer surrounding the interfacial boundary of the droplets, and turbulent energy dissipation distribution per volume within the coalescing apparatus.

U.S. Pat. No. 6,413,429 to Breman et al. discloses a process and an apparatus for extracting a component dissolved in a liquid by means of liquid-liquid extraction using an extraction liquid which is immiscible or only partially miscible with the liquid, in which process the extraction liquid is dispersed in the liquid in a dispersion apparatus and then coalesced in a coalescer, after which the extraction liquid, the specific weight of which differs by at least 5% from the specific weight of the liquid to be extracted in which the component to be extracted is to be found, is separated from the liquid by gravity in a phase separator in which process in order to obtain an efficiency per extraction stage of at least 0.9 at an average residence time of at most 15 seconds in the dispersion apparatus and of at most 300 seconds in the phase separator, at a linear velocity in the coalescer related to its cross-section of at least 30 m/hour: a. the dispersion apparatus used is a centrifugal pump which will give droplets having an average diameter of 5 to 500 µm, b. the coalescer used is a packed bed of 5-100 cm high composed of dimensionally stable particles wettable by the extraction liquid having an average particle size of 0.05 to 2 mmL and c. the coagulated phase in the phase separator is separated at a linear velocity related to the cross-section of the phase separator of 0.1 to 0.7 times the linear velocity in the coalescer.

U.S. Pat. No. 4,747,694 to Hutholm et al. discloses a method for dispersing the two liquid phases of a solvent extraction process well together, for controlling the desired type of dispersion and for raising the created dispersion to a level essentially higher than the liquid surface in the mixing tank. In the apparatus of the invention, to the circulation cylinder of the mixer there is connected the heavy phase return conduit and the light phase return conduit entering from the settler of the same extraction step. In the top part of the mixer, coaxially with the turbine pump, there is installed the dispersion pump where the dispersion rises to above the liquid surface of the mixer through 2-24 rising pipes. The top ends of the rising pipes are connected to the circular pipe, wherefrom the dispersion flow is conducted to the next stage through the collecting trough.

SUMMARY OF THE INVENTION

According to an aspect of some embodiments of the present invention there is provided a system for mixing a mixture including: a reactor vessel; an impeller having a blade wherein the product of length of the blade squared and a width of the blade and a blade number is greater than 2% of the volume of the reactor, and a rounded edge on the blade and wherein the rounded edge has a radius of curvature facing flow of at least 2.5% of the blade length.

According to an aspect of some embodiments of the present invention there is provided a system for mixing a mixture including: a reactor vessel; an impeller having a blade wherein the product of length of the blade squared and a width of the blade and a blade number is greater than 2% of the volume of the reactor, and a power source configured to spin the impeller at a rate such that a tip speed v of the impeller obeys the relation $4 \text{ m}^2\text{s}^{-3} \leq 0.3 \text{ v}^3 \sin^2(\alpha)/B$ where $\alpha$ is a pitch of the blade and B is the maximum of the blade length and the blade width, $B=\max[L, W]$.

According to an aspect of some embodiments of the present invention there is provided a system for mixing a mixture including: a reactor vessel; an impeller having a blade wherein the product of length of the blade squared and a width of the blade and a blade number is greater than 2% of the volume of the reactor, and a power source configured to provide an energy input to the impeller of least 0.3 W/kg of fluid in the vessel.

According to some embodiments of the invention, the blade has a rounded edge and the rounded edge has a radius of curvature facing flow of at least 1% of the blade length.

According to some embodiments of the invention, the system may further include a power source configured to spin the impeller at a rate such that a tip speed v of the impeller obeys the relation $4\ m^2s^{-3} \leq 0.3\ v^3\ \sin^2(\alpha)/B$ where $\alpha$ is a pitch of the blade and B is the maximum of the blade length and the blade width, B=max[L, W].

According to some embodiments of the invention, vessel has a capacity of at least 1 $m^3$.

According to some embodiments of the invention, the system may further include: at least one baffle.

According to some embodiments of the invention, the system may further include: a power source configured to spin the impeller at a rate such that a tip speed v of the impeller obeys the relation $0.3\ v^3\ \sin\ 2(\alpha)/B \leq 20\ m^2s^{-3}$ where $\alpha$ is a pitch of the blade and B is the maximum of the blade length and the blade width, B=max[L, W].

According to some embodiments of the invention, the system is configured for mixing a mixture having a dynamic viscosity of between 2 and 20 cP.

According to some embodiments of the invention, the system may further include: a power source configured to provide at an energy input to the impeller of least 0.3 W/kg of fluid in the vessel.

According to some embodiments of the invention, the system may further include: an impeller zone swept out by the impeller has a volume of at least 5% of a total volume of the vessel.

According to an aspect of some embodiments of the present invention there is provided a method of mixing a fluid including: introducing a fluid into a reactor, and rotating a large impeller to stir the fluid in the reactor wherein an average specific power of the rotating is at least 0.3 W/kg of the fluid.

According to some embodiments of the invention, the rate of rotation imparts a tip speed v to the impeller the tip speed v obeying the relation $4\ m^2s^{-3} \leq 0.3\ v^3\ \sin^2(\alpha)/B$ where $\alpha$ is a pitch of the blade and B is the maximum of the blade length and the blade width, B=max[L, W].

According to some embodiments of the invention, the fluid is a solvent extraction mixture.

According to some embodiments of the invention, the solvent extraction is for metallurgy.

According to some embodiments of the invention, the introducing is of a volume of at least 1 $m^3$.

According to some embodiments of the invention, the rotating imparts the tip speed v to the impeller obeying the relation $0.3\ v^3\ \sin^2(\alpha)/B \leq 20\ m^2s^{-3}$.

According to some embodiments of the invention, the fluid further includes a continuous phase and a distributed phase and the method further includes separating the continuous phase from the distributed phase.

According to some embodiments of the invention, the fluid has a viscosity between 2 and 20 cP.

According to some embodiments of the invention, the impeller has a blade width W a blade length L and a blade number k such that the product of the length squared and the width and the blade number is greater than 2.0% of the volume of the reactor.

According to an aspect of some embodiments of the present invention there is provided a method of mixing two liquids for improved extraction including: inputting at least the two liquids into a reactor; adding mixing energy to the reactor to achieve a mean mixing energy of at least 0.3 W/kg in the reactor, and distributing the mixing energy to achieve a maximum energy dissipation zone including at least 2.0% of the volume of the reactor and having an energy dissipation of at least 2 W/kg.

According to an aspect of some embodiments of the present invention there is provided a method of mixing two liquids for improved extraction including: inputting at least the two liquids into a reactor; adding mixing energy to the reactor to achieve a mean mixing energy of at least 0.3 W/kg in the reactor, and distributing the mixing energy to achieve a volume of the vessel having an energy dissipation of at least 20 W/kg that is less than 0.01% of the total volume of the reactor.

According to an aspect of some embodiments of the present invention there is provided a method of solvent extraction including: feeding a first liquid containing a solute into a reactor; introducing a second liquid into the reactor; wherein the first liquid and the second liquid are immiscible; mixing the first liquid and the second liquid in the reactor to form an emulsion; retaining the first liquid and the second liquid in the reactor until an economically significant portion of the solute transfers from the first liquid to the second liquid and separating a recovered portion of second liquid including the economically significant portion of the solute from the emulsion in less than 15 minutes.

According to an aspect of some embodiments of the present invention there is provided a method of retrofitting a metal extraction plant, the plant including a pump mixer configured for feeding an emulsion of two immiscible liquids into an auxiliary mixer, the method including: routing at least one of the two immiscible liquids directly to the auxiliary mixer; operating the auxiliary mixer to form an emulsion of the two immiscible liquids in the auxiliary mixer.

According to some embodiments of the invention, when fed to the auxiliary mixer a first liquid of the two immiscible liquids includes a solute and wherein the operating includes: retaining the first liquid a second liquid of the two immiscible liquids in the reactor until an economically significant portion of the solute transfers from the first liquid to the second liquid, and separating a recovered portion of the second liquid including the economically significant portion of the solute from the emulsion in less than 15 minutes.

According to some embodiments of the invention, the separating is for less than 10 minutes.

According to some embodiments of the invention, the separating is for less than 5 minutes.

According to some embodiments of the invention, the recovered portion of the second liquid includes less than 50 ppm of the first liquid.

According to some embodiments of the invention, the recovered portion of the second liquid includes less than 75 ppm of the first liquid.

According to some embodiments of the invention, the separating includes gravity settling.

According to some embodiments of the invention, the separating is in a vessel having a volume of less than 15 times the combined rate per minute of the introducing and of the feeding.

According to some embodiments of the invention, the mixing includes maintaining at least one of the following mixing parameters: a large volume of high energy dissipation and a small volume of extremely high energy dissipation.

According to some embodiments of the invention, combined rate of the feeding and the introducing is between 40 cubic meters per minute and 200 cubic meters per minute.

According to some embodiments of the invention, the feeding is of a continuous phase of the second liquid.

According to some embodiments of the invention, the introducing is of a continuous phase of the first liquid.

According to some embodiments of the invention, the economically significant portion is greater than 75%.

According to some embodiments of the invention, the economically significant portion is greater than 90%.

According to some embodiments of the invention, the economically significant portion is greater than 96%.

According to some embodiments of the invention, the first phase is a non-aqueous phase and the second phase is an aqueous phase.

According to some embodiments of the invention, the mixing includes: agitating the reactor at an average energy rate of between 2 and 20 W/Kg.

According to some embodiments of the invention, the residence time of the retaining is between 50 sec and 600 sec.

According to some embodiments of the invention, the solute contains a valuable metal to be extracted.

According to some embodiments of the invention, the valuable metal is Copper.

According to some embodiments of the invention, the method may further include producing a purified Copper.

According to some embodiments of the invention, the method may further include producing a purified phase of the valuable metal.

According to some embodiments of the invention, the method may further include: avoiding local energy dissipation rates of greater than 20 W/kg in more than 0.01% the reactor.

According to some embodiments of the invention, the distribution of the mixing energy achieves a volume of the vessel having an energy dissipation of at least 20 W/kg that is less than 0.01% of the volume of the reactor.

According to some embodiments of the invention, the method may further include: supplying a rounded edge perpendicular to flow.

According to some embodiments of the invention, the mean mixing energy input is sufficient to achieve breaking and coalescence of droplets.

According to some embodiments of the invention, the mean mixing energy input may be configured to achieve less than 100 ppm of droplets having a diameter less than 10 microns.

According to an aspect of some embodiments of the present invention there is provided a reactor for mixing a multiliquid mixture including: an impeller having rounded edges perpendicular to the relative velocity of liquid; a baffle having a rounded edge perpendicular to a second shear zone, and a power source capable of providing a mean mixing energy density of at least 0.2 W/kg mixing power to the mixture.

According to some embodiments of the invention, the impeller and the baffle are configured to distribute mixing energy such that in at least 1.0% of the reactor volume the energy dissipation is equal to at least 2 W/kg.

According to an aspect of some embodiments of the present invention there is provided a system for mixing a mixture including: a reactor vessel for holding the mixture; a power source configured to spin an impeller at a rate such that a tip speed v of the impeller obeys the relation $4\ m^2s^{-2} \leq 0.3\ v^3 \sin^2(\alpha)/B$ where $\alpha$ is a pitch of the blade and B is the maximum of the blade length and the blade width, $B=\max[L, W]$, and a baffle configured to distribute in the mixture a dissipation of an energy supplied by the impeller.

According to some embodiments of the invention, the vessel has a capacity of at least 1 $m^3$.

According to some embodiments of the invention, the power source is further configured to spin the impeller at a rate such that a tip speed v of the impeller obeys the relation $0.3\ v^3 \sin^2(\alpha)/B \leq 20\ m^2s^{-3}$ where $\alpha$ is a pitch of the blade and B is the maximum of the blade length and the blade width, $B=\max[L, W]$.

According to some embodiments of the invention, the system is configured for mixing a mixture having a dynamic viscosity of between 2 and 20 cP.

According to some embodiments of the invention, the power source is configured to provide at an energy input to the impeller of least 0.3 W/kg of fluid in the vessel.

According to some embodiments of the invention, an impeller zone swept out by the impeller has a volume of at least 5% of a total volume of the vessel.

According to some embodiments of the invention, the reactor has a volume between 1 $m^3$ and 100 $m^3$.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is a flow chart of an exemplary embodiment of a method for mixing two immiscible liquids;

DESCRIPTION OF SPECIFIC EMBODIMENTS OF THE INVENTION

Figure 1A:
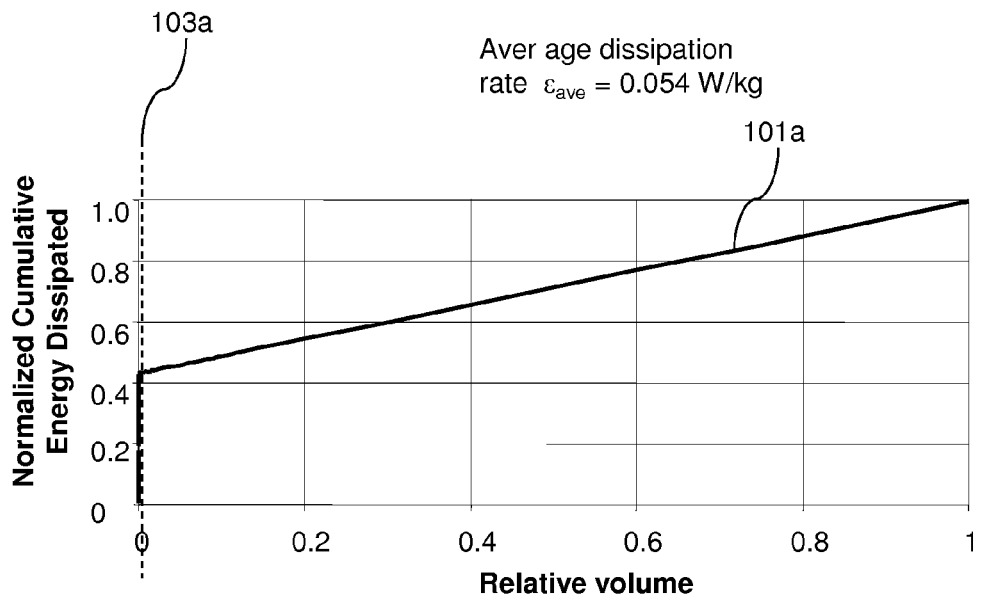
FIG. 1A is a large scale graph of a simulated cumulative energy distribution versus normalized tank volume for a conventional hydrofoil mixing system.

The present invention, in some embodiments thereof, relates to a method and system for mixing a fluid and, more particularly, but not exclusively, to a system and method to mix a low viscosity mixture of two immiscible liquids that, in some embodiments, may achieve high mass transfer rate and separability.

Overview

An aspect of some embodiments of the current invention is that it may mix immiscible liquids in a manner that achieves high separability. In some embodiments the mixing may optionally achieve a high mass transfer rate between the liquid phases. For example, mass transfer may include a dissolved or suspended material being transferred from one liquid to the other. There may be many ways to achieve high separability and/or mass transfer rate. For example, the reactor may achieve even distribution of a dispersed phase in the reactor volume. For example, the reactor may achieve that a large portion of the dispersed phase is distributed in the reactor in relatively small droplets. For example the reactor may achieve a high rate of break up and coalescence of droplets of the dispersed phase. For example, the reactor may achieve a very low concentration of droplets smaller than a minimum settling diameter in an effluent flow.

In some embodiments, the liquid mixture may be used in a solvent extraction (SX) process. For example the mixture may include a metallurgical solvent extraction mixture. Optionally the mixture may have a low viscosity. For example the dynamic viscosity of the mixture may range between 1 and 20 cP. Optionally, the methodology and system of the current patent may apply to industrial scale reactors. For example the volume of the reactor may be greater than 1 $m^3$ and/or the hydraulic diameter of the reactor vessel may range between 1 and 10 m or more. Optionally, liquids in the reactor may have a density ranging between 700 and 1300 $kg*m^{-3}$. The mixture may optionally include solids or/and gas. Alternatively the mixture may not include solids and/or gas.

Uniformly Distribute (High) Energy Dissipation

An aspect of some embodiments of the current invention is that the mixing energy input into the reactor per unit mass of the fluid may be high. For example, the average energy input to the reactor may range between 0.3 and 3.0 W/kg. Alternatively or additionally, the energy input to the reactor may range between 0.2 and 0.3 W/kg.

Alternatively or additionally, the energy input into the reactor may range between 3.0 and 4.0 W/kg and/or be greater than 4 W/kg.

In some embodiments, the mixing and turbulent energy dissipation may be distributed relatively uniformly in the reactor. For example, there may be a large zone of high energy dissipation. Optionally, the zone of maximum energy dissipation and/or the impeller zone may be very large. For example, the zone of maximum energy dissipation may include between 1 and 2.5% of the total tank volume. Alternatively or additionally, the zone of maximum energy dissipation may include between 2.5% and 5% and or between 5% and 10% or even more than 10% of the total tank volume. For example, the impeller zone (the volume of rotation swept out by the impeller blade) may include between 15% and 30% or the total tank volume. Alternatively or additionally, the impeller zone may include between 3% and 10% and/or between 10% and 15% and/or more than 30% of the tank volume. For example the volume of the reactor having local energy dissipation between 4 and 10 W/kg may be at least 2% of the reactor volume.

Alternatively or additionally, the volume of the reactor having local energy dissipation between 2 and 20 W/kg may be at least 2% of the reactor volume.

In some embodiments, the volume of the reactor having extremely high energy dissipation may be small. For example the volume of the reactor having local energy dissipation greater than 20 W/kg may less than 0.01% of the reactor volume.

Alternatively or additionally, the volume of the reactor having local energy dissipation greater than 20 W/kg may less than 0.005% of the reactor volume.

In some embodiments, the mixing may result in a highly compact droplet size distribution in the mixture. For example, most of the droplets of the dispersed phase may have diameters ranging between 0.3 and 4.0 mm. For example, the concentration of droplets having diameter less than 10 microns may be less than 100 ppm. Alternatively or additionally, the concentration of droplets having diameter less than 10 microns may be less than 50 ppm and/or may be less than 20 ppm.

Design Aspects of a Reactor

In some embodiments, a reactor may include a large impeller. The large impeller may, optionally, have a large blade length L and blade width W. For example, the blade length L and the blade width W may be of order of the blade radius d/2. The impeller may optionally rotate faster than conventional large impellers. The impeller may optionally rotate slower than impellers commonly used in low viscosity mixtures, for example hydrofoil impellers. Optionally, the rotation speed and/or power may be adjustable. Optionally the impeller blades may be pitched. For example, the pitch angle may range between 45 and 75 degrees. The width of the blade may optionally be larger than half of the blade radius. The outer radius of the impeller may range, for example, between 40% and 70% of the hydraulic radius of the reactor vessel. The large impeller may optionally be used for mixing a low viscosity mixture.

In some embodiments, the speed of the outer edge of the impeller may be relatively uniform (for example within ±5%). For example the impeller may have a helical form. Alternatively or additionally a pitched blade may have an elliptical form such that the distance from the axis of rotation to the outer edge of the blade is relatively uniform. The rotational rate and/or the tip speed of the impeller may be relatively high.

In some embodiments, the reactor may include one or more baffles. A baffle may optionally be connected to a wall of the reactor. A projection of a baffle onto the plane formed between the baffle tip and the axis of rotation of the impeller may be at least half the working area of the impeller blade.

A pitched impeller may optionally pump a fluid. For example, fluid may be pumped along the axis of a pitched impeller. For example, for an impeller mounted on a substantially vertical axis, fluid may be pumped upward and/or downward. Alternatively or additionally, fluid may be pumped radially inward and/or outward. A pitched blade impeller may optionally have helical blade and or an elliptical blade and/or a different form of blade.

Round Edges Facing Flow (Elimination of Sharp Edges)

An aspect of some embodiments of the current invention is that the reactor may be configured to avoid flow over sharp edges. For example, edges of impeller blades and/or baffles may be rounded. For example, the outer edges of impeller blades and/or the inner edges of baffles may be rounded. The rounded edges facing the flow may have a radius of curvature $r_c$ of not less than 1% of the impeller blade length L ($r_c \geq 0.01$ L).

Optionally, the radius of curvature $r_c$ may be greater than 2.5% of the blade length L. Optionally the curved section having the prescribed radius of curvature may include a section ranging between −90 and 90 degrees with respect to the mean flow direction. Alternatively or additionally curved section having the prescribed radius of curvature may include a section ranging between −15 and 15 and/or between −45 and 45 degrees with respect to the mean flow direction. The curved section may be optionally symmetrical or non-symmetrical. Alternatively or additionally the curved section may include, for example, a complete closed shape. Optionally, solid edges directed against shear zones may be similarly rounded depending on the shear rate near the edge.

DESCRIPTION OF EMBODIMENTS

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Energy Dissipation Vs. Volume

Figure 1B:
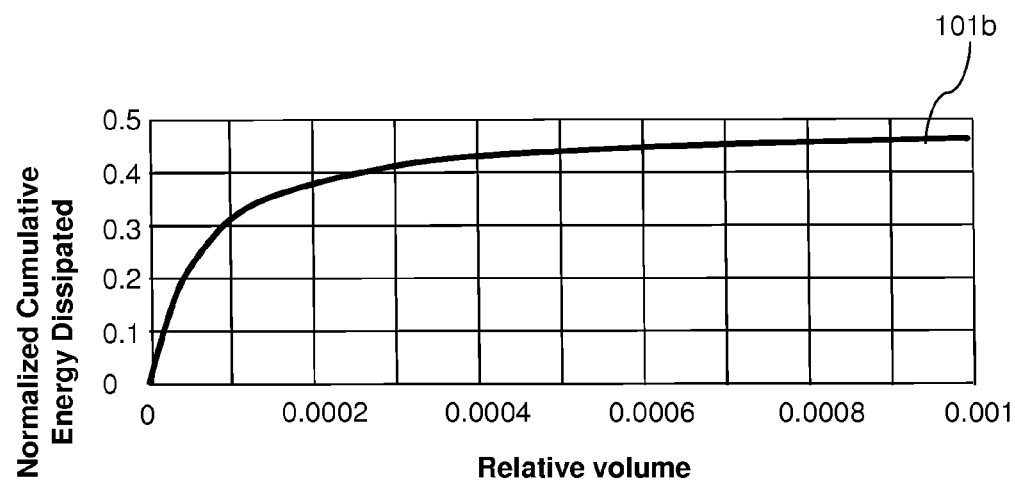
FIG. 1B is a graph of an exemplary simulated cumulative energy distribution versus normalized tank volume in the high energy zone for a conventional hydrofoil mixing system.
Figure 1C:
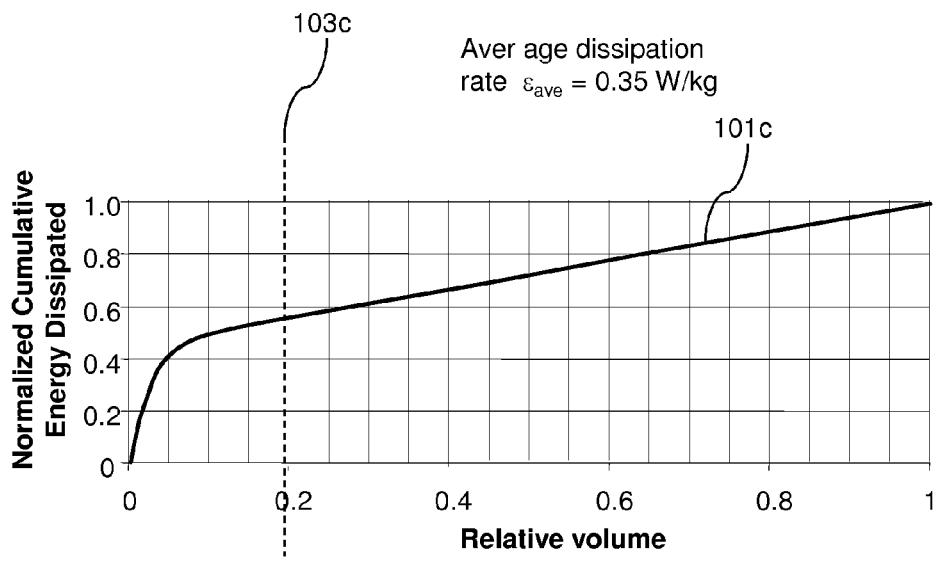
FIG. 1C is a large scale graph of an exemplary simulated cumulative energy distribution versus normalized tank volume for a mixing system according to the current invention.
Figure 1D:
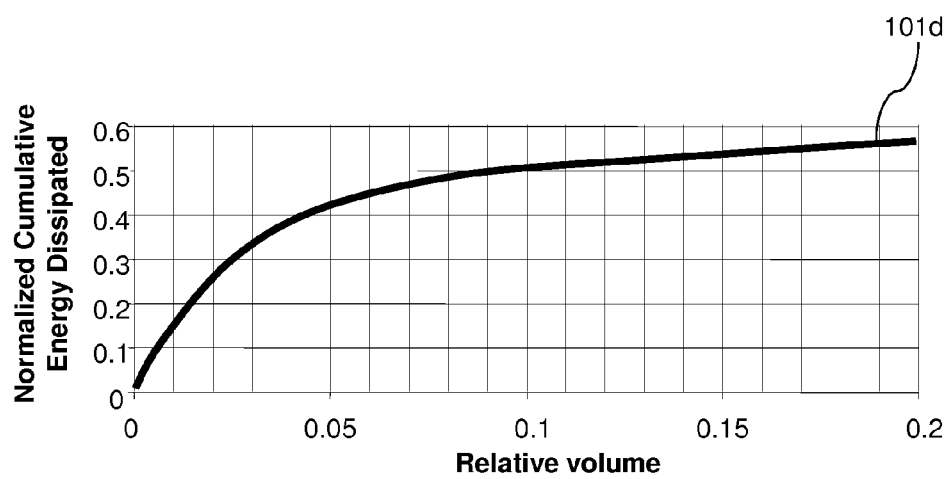
FIG. 1D is a graph of an exemplary simulated cumulative energy distribution versus normalized tank volume in the impeller zone for a mixing system according to the current invention.

For purposes of better understanding some embodiments of a cumulative energy dissipation distribution according to the present invention, as illustrated in FIGS. 1C and 1D of the drawings, reference is first made to a simulated cumulative energy dissipation distribution of a mixing reactor having a conventional hydrofoil impeller as illustrated in FIGS. 1A and 1B.

FIGS. 1A and 1B are schematic Cumulative Distribution Functions (CDF) showing the distribution of energy dissipation in a reactor stirred by a conventional hydrofoil impeller. In FIG. 1A it can be seen that in the exemplary embodiment, the impeller zone marked by line 103a is very small.

On the graph the abscissa marks the relative volume ($V_r/V_T$ where $V_r$ is the volume of the region and $V_T$ is the total volume of the reactor) and the ordinate marks the normalized greatest average energy dissipated in any portion of the reactor having a volume $V_r$ ($y = \varepsilon_{max}/\varepsilon_{ave} * V_r/V_T$) were $\varepsilon_{max}$ is the greatest average rate of energy dissipation in any zone of volume $V_r$ and $\varepsilon_{ave} = 0.054$ W/kg is the average energy dissipation rate of the system). Particularly, FIG. 1A and line 101a illustrate the full energy dissipation distribution and FIG. 1B and line 101b illustrate the energy dissipation distribution of the high energy zone.

FIGS. 1C and 1D are schematic Cumulative Distribution Functions (CDF) showing the distribution of energy dissipation in an exemplary embodiment of a reactor according the current invention. In FIG. 1C it can be seen that in the exemplary embodiment, the impeller zone marked by line 103c is much larger than the impeller zones of many conventional low viscosity mixing systems. For example, about 20% of the reactor volume, as shown for example in graph 1D, is in the impeller zone.

Dissipation in the 1% of the volume having the highest energy dissipation is optionally much less than some conventional mixing systems.

On the graph the abscissa marks the relative volume ($V_r/V_T$ where $V_r$ is the volume of the region and $V_T$ is the total volume of the reactor) and the ordinate marks the normalized greatest average energy dissipated in any portion of the reactor having a volume $V_r$ ($y = \varepsilon_{max}/\varepsilon_{ave} * V_r/V_T$) were $\varepsilon_{max}$ is the greatest average rate of energy dissipation in any zone of volume $V_r$ and $\varepsilon_{ave} = 0.35$ W/kg is the average energy dissipation rate of the system). Particularly, FIG. 1C and line 101c illustrate the full energy dissipation distribution and FIG. 1D and line 101d illustrate the energy dissipation distribution of the impeller zone.

In the exemplary embodiment of FIGS. 1C and 1D, for example, between 5 and 15% of the energy is dissipated in the 0.5% of the volume of the reactor having the highest energy dissipation rate. In the exemplary embodiment of FIGS. 1C and 1D, for example, between 10 and 20% of the energy is dissipated in the 1% of the volume of the reactor having the highest energy dissipation rate. In the exemplary embodiment of FIGS. 1C and 1D, for example, between 20 and 30% of the energy is dissipated in the 2% of the volume of the reactor having the highest energy dissipation rate. In the exemplary embodiment of FIGS. 1C and 1D, for example, between 50 and 60% of the energy is dissipated in the impeller zone (marked by line 103c) which is the 20% of the volume of the reactor having the highest energy dissipation rate. The local volumetric rate of energy dissipation (represented by the slope of curves 101c,d) is highest in the impeller zone and dies off and becomes more or less constant outside of the impeller zone (where the slope is approximately constant).

Method of Mixing

FIG. 2 is a flow chart illustration of an exemplary embodiment of a method of mixing a low viscosity solvent extraction mixture according to some embodiments of the current invention. A mixing reactor is supplied 202. The mixing reactor may optionally include a large pitched blade impeller and/or baffles. The impeller and/or the baffles may, optionally, include rounded edges.

In some embodiments, the impeller blades may be large enough such that the product of the blade width W, blade length L squared and the blade number k is greater than 2.0% of the total volume of the reactor $L^2 W k > 0.02 V_T$. For example the blade width and length (L and W) may be measured in (m) and the volume of the reactor may be measured in (m³). The number of blades k may be non-dimensional. Alternatively or additionally, the product of the blade width W, blade length L squared and the blade number k may range between 2.0% and 3.0% of the total volume of the reactor $0.02 V_T < L^2 W k < 0.03 V_T$ and/or the product of the blade width W, blade length L squared and the blade number k may range between 3.0% and 5.0% of the total volume of the reactor $0.03\ V_T < L^2 W\ k < 0.05 V_T$ and/or the product of the blade width W, blade length L squared and the blade number k be greater than 5.0% of the total volume of the reactor $0.05\ V_T < L^2 W\ k$.

In some embodiments, the impeller blade and/or the baffles may have rounded edges. The rounding of the edges may in some embodiments avoid high energy dissipation near the edge. Optionally, other edges at high angles to high shear zones may be rounded.

The reactor may optionally be an industrial reactor. For example the reactor volume may be greater the 1 m³ and/or the reactor hydraulic diameter may, for example, be between 1 and 10 m or even larger.

While there are many ways to control effluent quality, in some embodiments, the relatively uniform energy dissipation distribution may be valuable for achieving a uniform desired characteristic of the reactor effluent. For example, the high relatively uniform energy dissipation may achieve a compact droplet size distribution. In some embodiments, a compact droplet size distribution may enhance settling and/or mass transfer. For example, the compact droplet size distribution may mean that there are few very fine droplets that are hard to separate.

In some embodiments a low viscosity SX mixture may be input 204 into the system. Optionally, the mixture may include metallurgy fluids. For example, the viscosity of the mixture may greater than 1 cP and/or it may be between 2 and 10 cP.

Alternatively and or additionally the viscosity of the mixture may be between 5 and 50 cP or more. In some embodiments the mixture will be fed into the reactor as a preformed emulsion. Alternately the mixture may be fed into the reactor as two or more continuous phases. The two continuous phases may be fed into the reactor as a single stream or in separate streams.

In some embodiments, the mixture may be stirred 206 in the reactor. The stirring may impart 208 high mixing energy into the mixture. For example, in some embodiments, the average stirring energy added to the reactor may range between 0.2 and 4 W/kg and/or be even more than 4 W/kg. In some embodiments the average stirring energy may be less than 20 W/kg. While there are many ways to control effluent quality, in some embodiments, the relatively high energy dissipation may be valuable for quickly achieving a uniform desired characteristic of the reactor effluent. For instance high energy dissipation may in some embodiments lead to fast droplet break-up and coalescence. The fast coalescence and break-up may in some embodiments lead quickly to a desired dynamic equilibrium droplet distribution.

In some embodiments the impeller may be rotated 210. Optionally, the rate of rotation 210 may be relatively high for a large impeller. Optionally, the tip speed of the impeller blades may be relatively large. For example, the tip speed v may be chosen such that $4\ m^2 s^{-3} \le 0.3\ v^3\ \sin^2(\alpha) B^{-1} \le 20\ m^2 s^{-3}$, where B is a maximum of blade length L and blade width W (B=max[W, L]), B may be measured in (m); v is the tip speed of the blade, v may be measured in (m/s), and is $\alpha$ is the pitch angle of the blade.

For example an industrial reactor may have an input feed rate of 60 m³/min. The input feed may include an emulsion and/or two or more immiscible phases entering the tank in separate feeds and/or a mixture including two or more continuous phases of immiscible fluids. For example the reactor may have a 5 m diameter and 3.5 m depth.

Consequently the tank may have a residence time of 1.15 min. The impeller diameter may optionally be d=2 m. The impeller length and width may optionally be W=L=B=0.7 m. The impeller rotation speed may optionally be 30 rpm with v=3.14 m/s. The mixing may optionally be strong enough to create an emulsion from separate immiscible phases and/or preserve an input feed emulsion.

In some embodiments, extremely high local rates of dissipation may be avoided 212. For example, edges of impeller blades and/or baffles may be rounded. For example, the outer edges of impeller blades and/or the inner edges of baffles may be rounded with a radius of curvature of not less than 1% of the impeller blade length L and/or not less than 2.5% of the impeller blade length L. Optionally, solid edges directed against shear zones may be similarly rounded depending on the shear rate near the edge.

In some embodiments, high energy dissipation rates may be spread 216 relatively evenly. For example, the average energy dissipation rate in the tank may be range between 0.2 W/kg and 4.0 W/kg or may be greater than 4.0 W/kg. For example the volume of the reactor having local energy dissipation between 4 and 20 W/kg may be at least 2% of the reactor volume. For example the volume of the reactor having local energy dissipation greater than 10 W/kg may less than 0.01% of the reactor volume.

In some embodiments, the effluent of the reactor may be separated 218.

Optionally, the methodology of the current invention may lead to enhanced separation characteristics and/or interphase mass transfer. For example retention time in the mixer may range between 0.5 minutes to 2 minutes. For example, interphase mass transfer may reach more than 75% and in some cases it may reach more than 90% of equilibrium and in some cases it may reach more than 95% of equilibrium in some cases it may reach more than 99%. For example, the effluent may be separated until the residual dispersed phase concentration in the continuous phase may be less than 100 ppm or even less than 50 ppm.

Reactor

Figure 3:
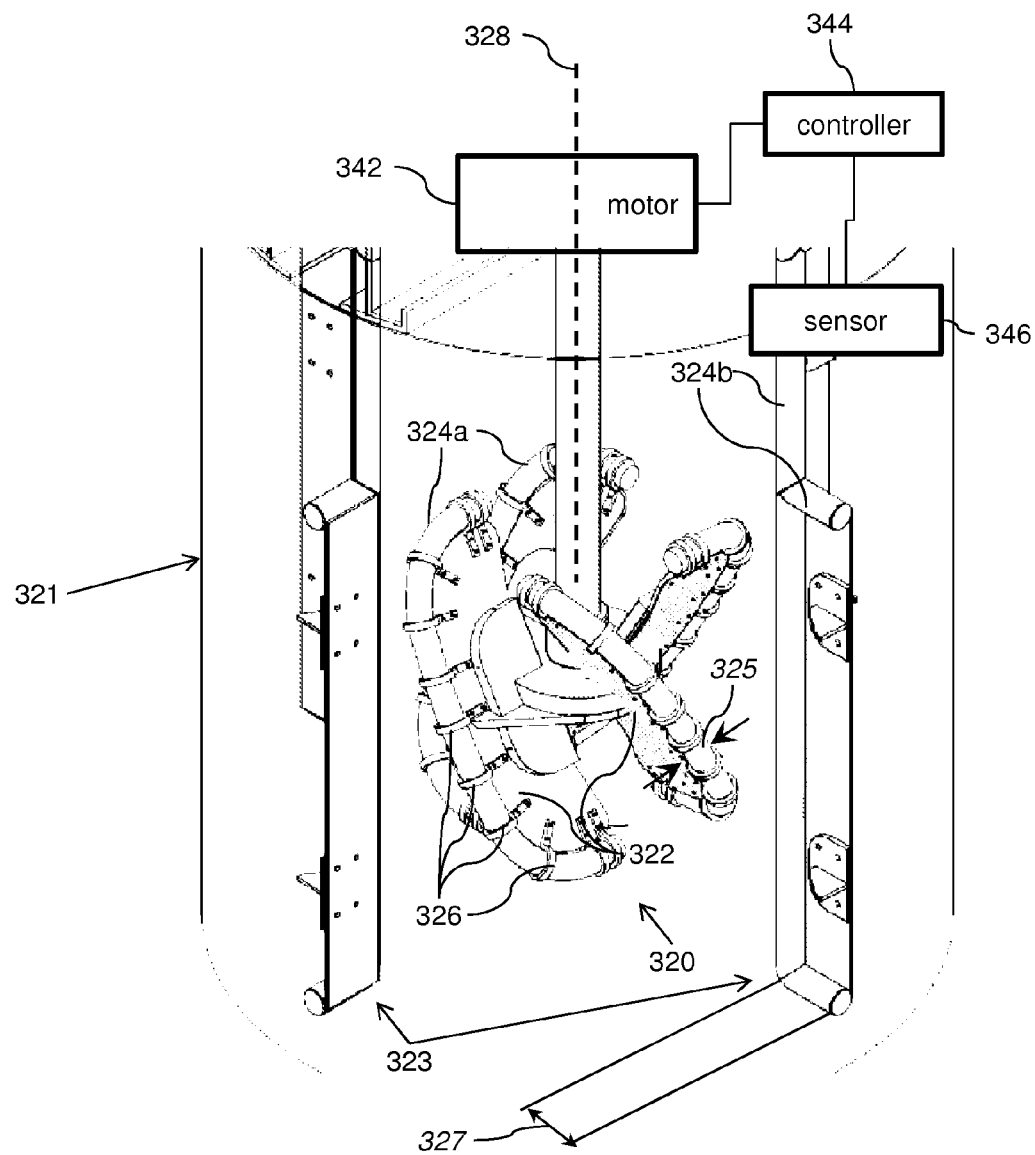
FIG. 3 is a schematic drawing of an exemplary embodiment of an apparatus for mixing two immiscible liquids.

FIG. 3 is a perspective illustration of an example of a mixing reactor according to the current invention. The figure shows an example of the scale and geometry of the system. Particularly, FIG. 3 illustrates an exemplary embodiment of the relative scales of a reactor vessel 321, baffles 323 including a rounded edge 324b, and an impeller 320 included blades 322 and rounded edges 324a.

The exemplary embodiment includes an exemplary embodiment of an impeller 320. Impeller 320 optionally includes four pitched blades 322 (blade number k=4). Pitched blades 322 optionally have an elongated approximately elliptical shape such that the distance from an axis 328 of rotation to the blade outer edges is approximately constant. In the exemplary embodiment, outer rounded edges 324a of the blade are optionally formed by attaching a pipe section to the edge of the blade by means of fasteners 326. The diameter 325 of the pipe is shown. The edges of fasteners 326 which are parallel to the flow over the blade and are optionally not rounded.

A reactor may optionally include a power source, for example motor 342. Motor 342 may rotate impeller 320. Optionally the rotational speed and/or power of motor 342 may be adjustable. For example, the operation of motor 342 may be controlled by a controller 344. Controller 344 may optionally adjust the power to motor 342 manually and/or automatically. For example, controller may be responsive to a sensor 346. A power to motor 342 may optionally be adjusted according to an output of sensor 346. Sensor 346 may optionally sense dissipation energy level and/or a level of turbulence and/or a level of turbidity. For example, a high turbidity may be a sign of the presence of small bubble and a power to motor 342 may be reduced. For example, if a turbulence is greater than a design threshold, a power to motor 342 may be reduced.

The exemplary embodiment includes four optional baffles 323. Baffles 323 may for example distribute energy dissipation through the reactor. In the exemplary embodiment of FIG. 3, baffles 323 are attached to the walls of reactor vessel 321. In the exemplary embodiment of FIG. 3, baffles 323 are vertical. In the exemplary embodiment of FIG. 3, baffles 323 are located in planes including axis 328 of rotation of impeller 320. In the exemplary embodiment of FIG. 3, baffles 323 are directed parallel to axis 328 of rotation of impeller 320. Alternatively or additionally, a reactor may include baffles that are not directed parallel to axis 328. Optionally, baffles may have a curved shape. In the embodiment of FIG. 3, axis 328 of rotation of impeller 320 is vertical. In the embodiment of FIG. 3, the projection of baffles 323 on a plane including axis 328 of impeller 320 is the height of baffles 323. Optionally baffles 323 have a height of slightly more than the height of impeller 320. Alternatively or additionally, the projection of the baffles onto the plane off axis 328 of impeller may range, for example, between half the height of the impeller and the entire height of reactor vessel. Optionally the width 327 of baffles 323 is greater than 5% of the length of blades 322 of impeller 320. Alternatively or additionally the width 327 of baffles 323 may range between 2.5 and 5% and or between 10 and 20% of the length of blades 322 of impeller 320. Baffles 323 may optionally include rounded edges 324*b*. Rounded edges 324*b* may be located where the edge is facing the mean flow.

In the exemplary embodiment, vessel 321 is cylindrical. Optionally, a reactor may have different geometries, rectangular for example. The outer diameter d of impeller 320 may range, for example, between 40% and 70% of the diameter of vessel 321.

In some embodiments the reactor may have a residence time range, for example, between 45 sec and 2 minutes. The feed rate may for example range between 50 to 100 m$^3$/min. The reactor volume may for example range between 37 to 100 m$^3$ in some cases the reactor volume may be as high as 200 m$^3$ or even more.

Impeller

Figure 4A:
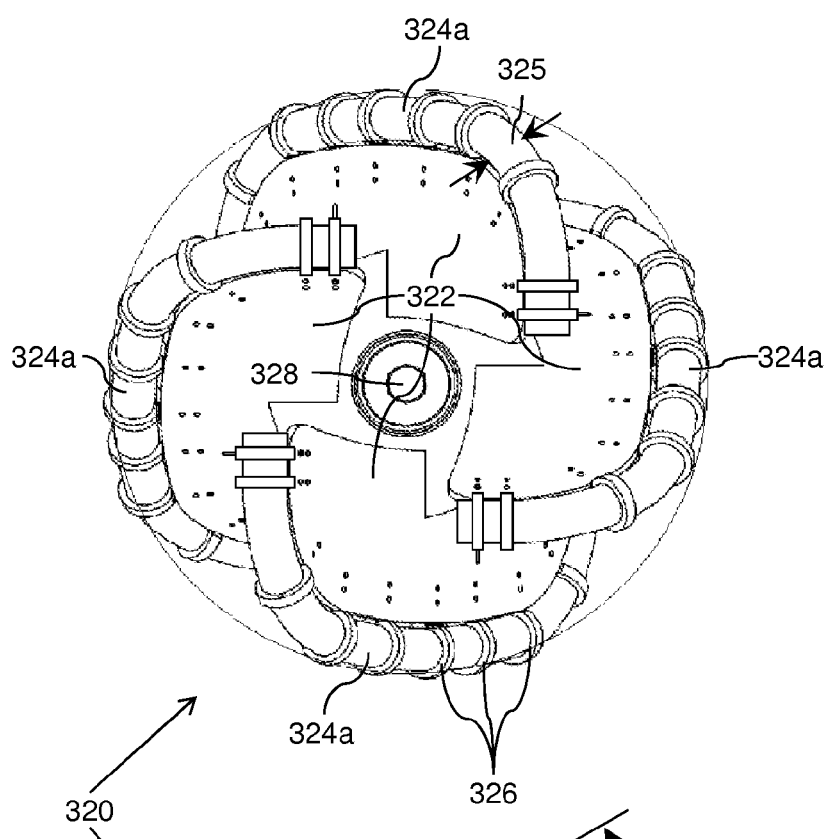
FIG. 4A is a perspective bottom view of an exemplary embodiment of an impeller.
Figure 4B:
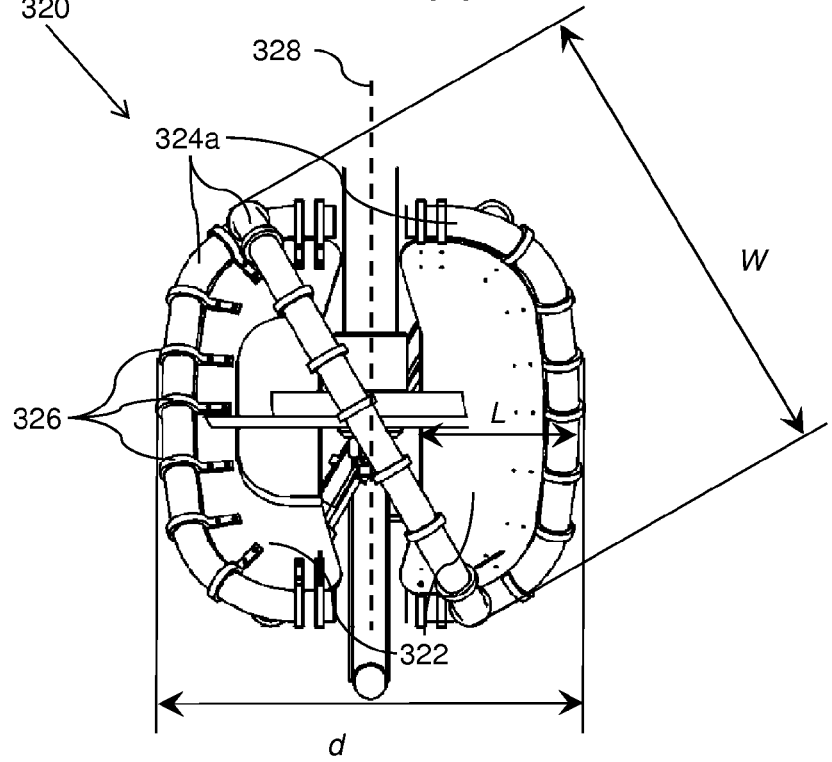
FIG. 4B is a perspective side view of an exemplary embodiment of an impeller.

FIGS. 4A and 4B illustrate details of the exemplary embodiment of impeller 320.

FIG. 4A illustrates impeller 320 from a view from below. FIG. 4B illustrates impeller 320 from a view from the side. The definitions of the impeller width W and impeller length L and impeller diameter d for the exemplary embodiment are illustrated. In the exemplary embodiment, the width of the blade W is larger than the half of the radius of the impeller. In the exemplary embodiment, the width of the blade W is larger than a quarter of the impeller's outer diameter W>d/4).

Figure 5:
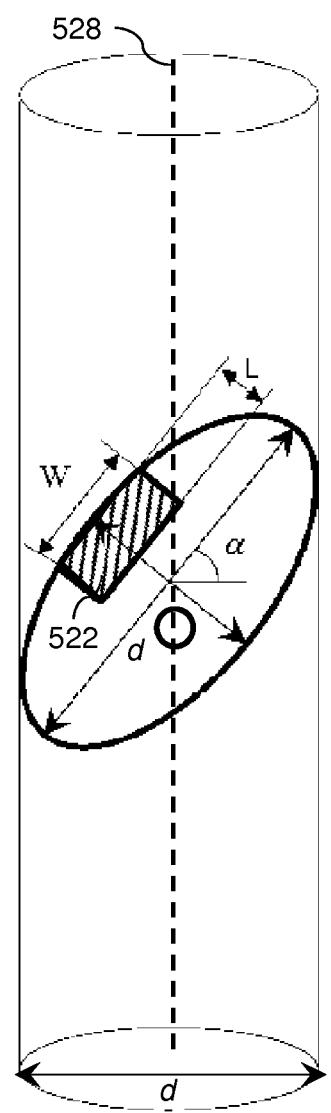
FIG. 5 is a perspective side view of an exemplary alternative embodiment of an impeller.

FIG. 5 is a schematic generalized exemplary illustration of an impeller blade 522. In the generalized illustration of FIG. 5, W is the length of blade 522 along the angle of pitch; L is the maximum length of blade 522 in the radial direction (perpendicular to axis 528 of rotation of the impeller); d is the diameter of the largest circle swept out by the impeller as it rotates; α is the pitch angle of blade 522. Optionally the pitch angle α may range, for example, between 45 and 75 degrees. In some embodiments, the pitch angle may be approximately 60 degrees. Optionally, the outer edge of blade 522 is part of an ellipse with an axis ratio equal to sinus of the pitch angle α. The edge may optionally have another shape having a circular projection on a plane normal to axis 528.

Figure 6:
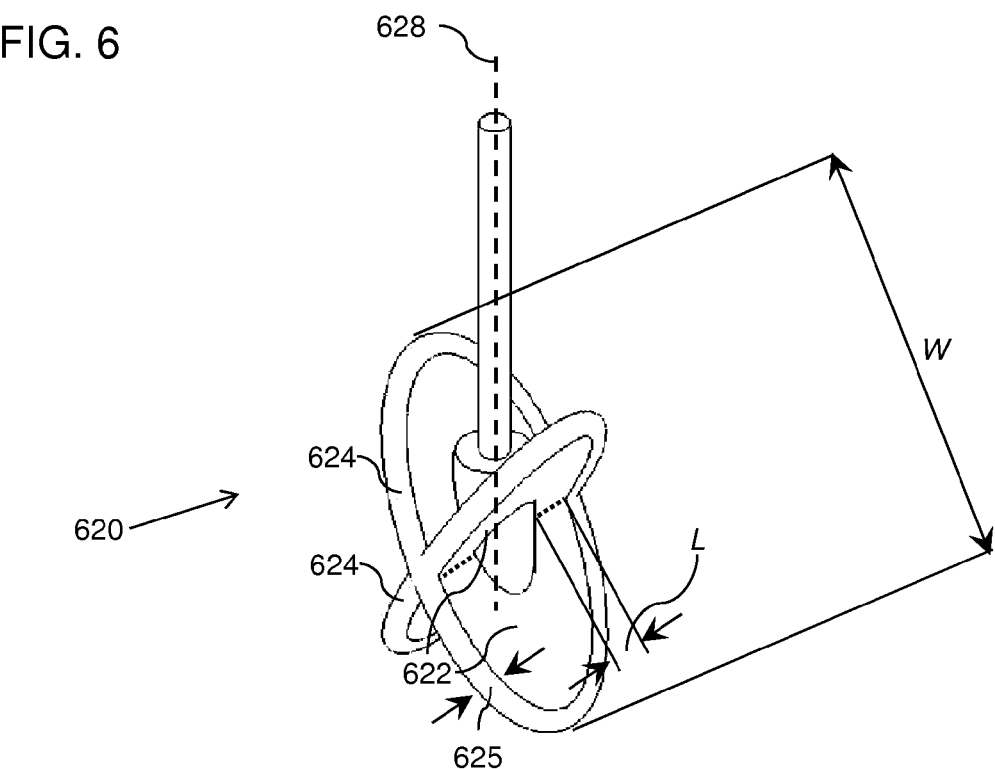
FIG. 6 is a perspective side view of an exemplary alternative embodiment of an impeller.

FIG. 6 is a schematic perspective illustration of an alternative embodiment of a pitched blade impeller 620 according to the current invention. Optionally, the outer edge of blade 622 is an ellipse with an axis ratio equal to sinus of the pitch angle. The elliptical shape of blades 622 causes the radial distance between rotational axis 628 of blades 622 and the edge of blades 622 to be substantially constant. Also illustrated is an optional integral rounded edge 624 to blades 622. Rounded edge 624 has a diameter 625 that is twice the minimal radius of curvature of the rounding.

Figure 7:
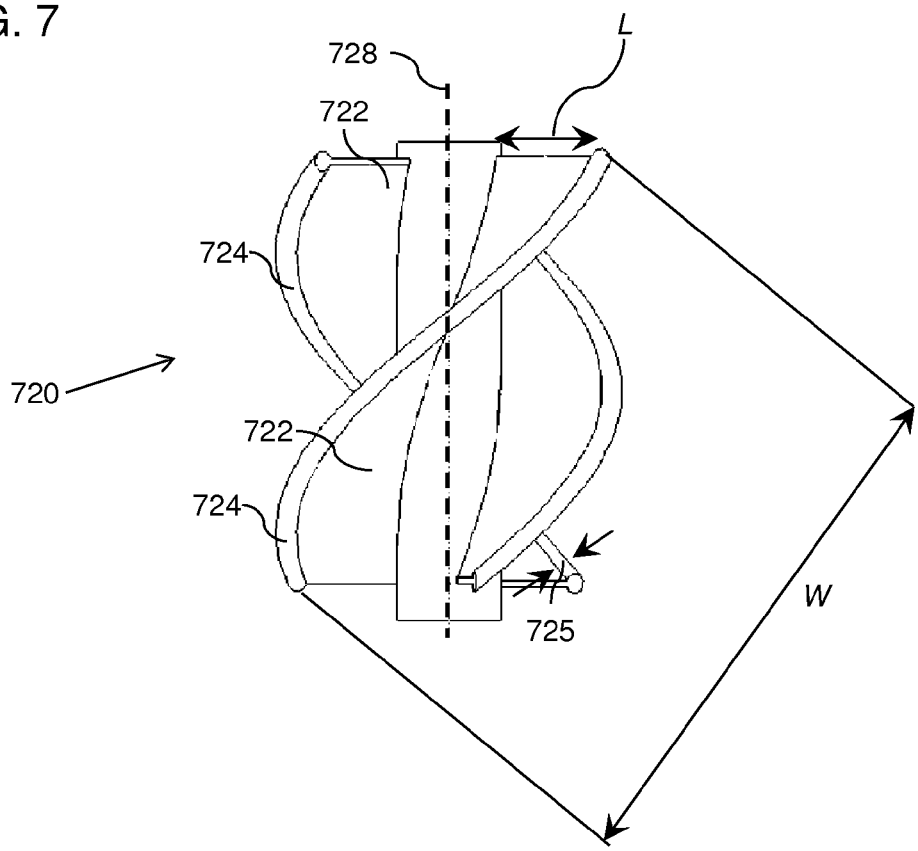
FIG. 7 is a schematic perspective side view of a helical impeller geometry.

FIG. 7 is a schematic perspective illustration of an exemplary embodiment of a section of a helical impeller 720 according to the current invention. Optionally, the outer edge of blade 722 of helical impeller 720 is at a substantially constant radial distance L from an axis 728 of rotation of impeller 720. Also illustrated is an optional integral rounded edge 724 to blades 722. The rounded edge has a diameter 725 that is twice the radius of curvature of the rounding.

Figure 8:
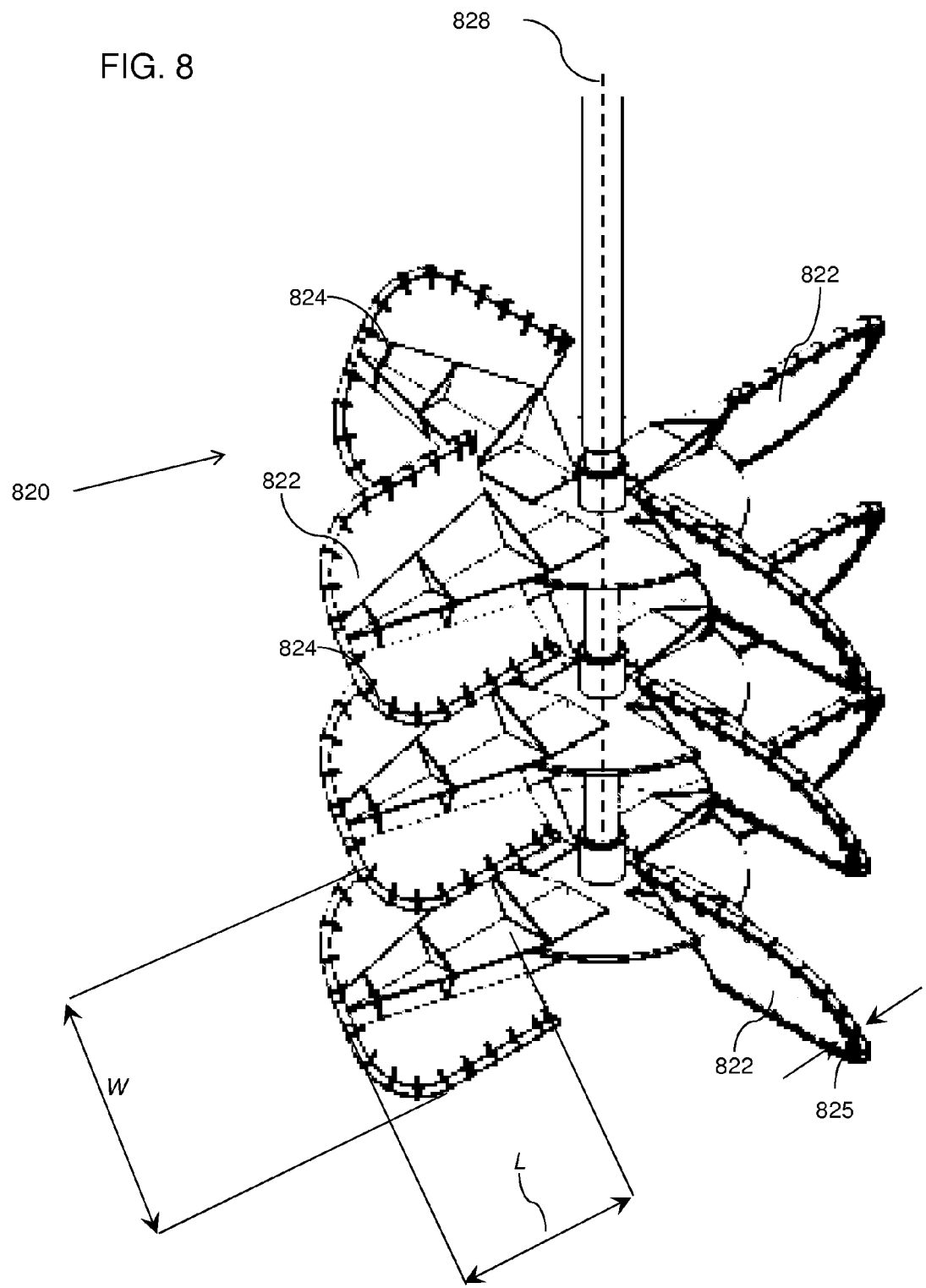
FIG. 8 is a perspective side view of an exemplary alternative embodiment of an impeller.

FIG. 8 is a schematic perspective illustration of an alternative embodiment of a blade number k=16 pitched blade impeller 820 according to the current invention.

Optionally, the outer edge of blade 822 is an ellipse with an axis ratio equal to sinus of the pitch angle. The elliptical shape of blades 822 causes the radial distance between rotational axis 828 of blades 822 and the edge of blades 822 to be substantially constant. Also illustrated is an optional rounded edge 824 to blades 822. Rounded edge 824 has a diameter 825 that is twice the minimal radius of curvature of the rounding.

Rounding

Figure 9A:
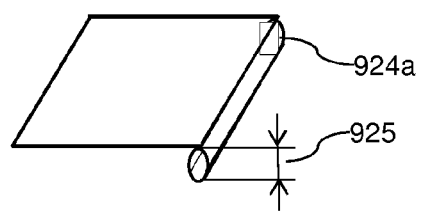
FIGS. 9A-D are perspective views of exemplary embodiments of a rounded edge.
Figure 9B:
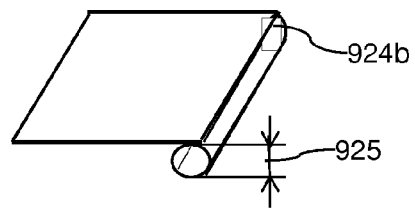
Figure 9C:
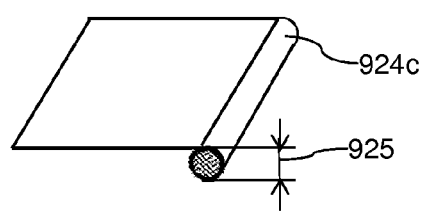
Figure 9D:
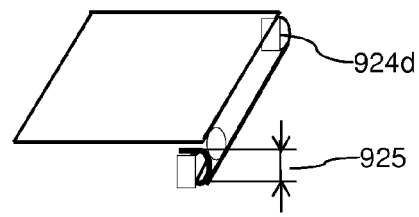

FIGS. 9A-D illustrate alternative exemplary embodiments of formation of a rounded edge 924*a,b,c,d*. Rounded edge 924*a* may optionally be formed as a hollow tube, for example as depicted in FIG. 9A,B (edges 924*a,b*). Alternatively or additionally the curve may be open, for example as depicted in FIG. 9C (edge 924*c*). Alternatively or additionally the curve may be filled, for example a solid cylinder as depicted in FIG. 9D (edge 924*d*). In any of the rounded edges 924*a,b,c,d* the cross section may optionally be circular or elliptical or of another shape. A diameter 925 of the rounded section may be defined, for example, as the twice the minimum radius of curvature that is facing the mean flow.

Applications

An aspect of some embodiments of the current invention is for mixing a liquid mixture. The process may be performed at industrial scale. For example the mixture may be part of a solvent extraction process, for example, liquid-liquid extraction. For example, solvent extraction may be used in metallurgy.

Figure 10:
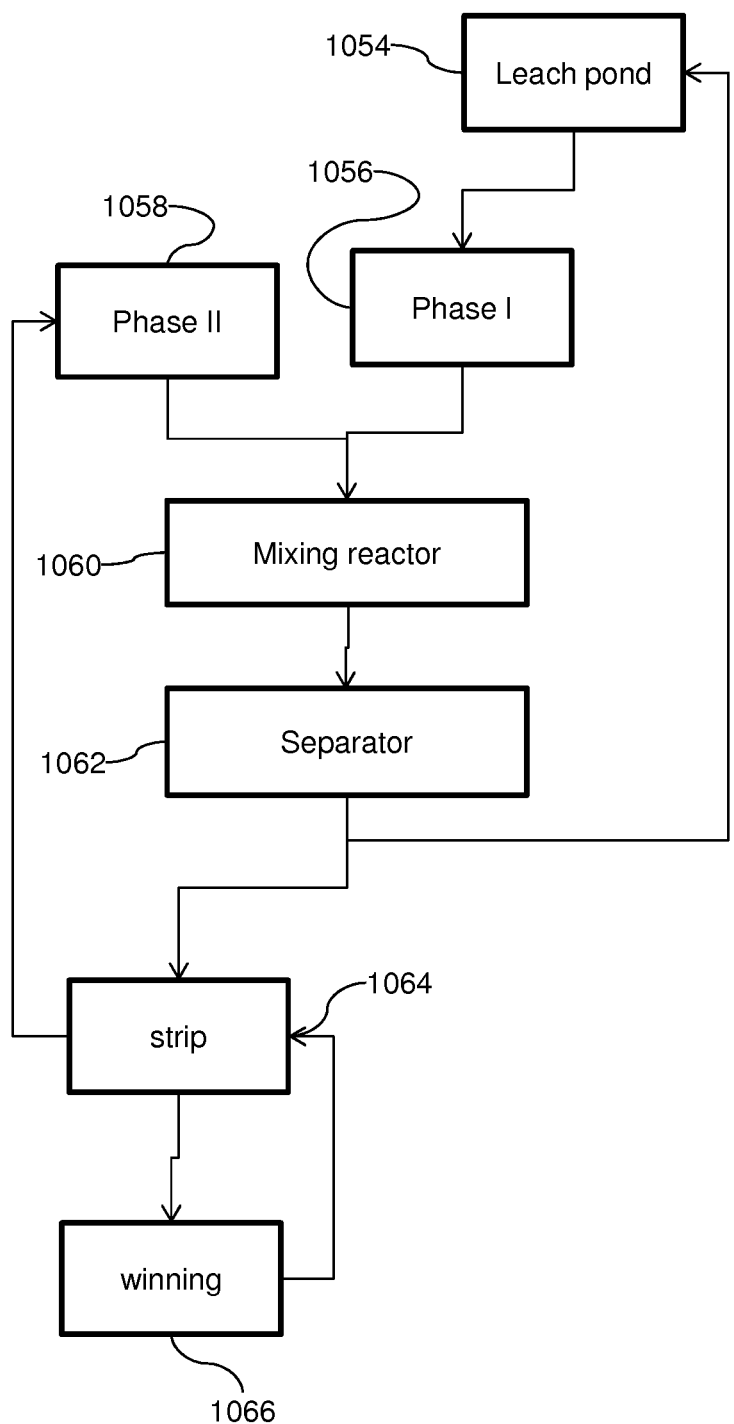
FIG. 10 is a block diagram of a solvent extraction process.

FIG. 10 is a block diagram illustrating some exemplary steps in an SX process. For example a metal ore may be placed in a leaching tank 1054 to be leached into an aqueous phase I 1056. Aqueous phase I 1056 may optionally be mixed with an organic phase II 1058. The two phases 1056 and 1058 may optionally be fed into a mixing reactor 1060. For example, aqueous phase I 1056 and organic phase II 1058 may be combined together to form an emulsion (for example in a pump mixer) and the emulsion may be fed into mixing reactor 1060. Alternatively or additionally, aqueous phase I 1056 and organic phase II 1058 may be fed into mixing reactor 1060 in separate streams.

Alternatively or additionally, aqueous phase I 1056 and organic phase II 1058 may be fed into mixing reactor 1060 as a mixture of two discrete continuous phases.

Mixing reactor 1060 may include, for example, a reactor as described above. In mixing reactor 1060, the metal may optionally undergo phase transfer to the organic phase II. The mixed effluent may optionally be sent to a separator 1062. The separator may include, for example a gravity separator and/or a centrifuge. The aqueous effluent of separator 1062 may optionally be sent back to leaching tank 1054. The organic effluent may optionally be sent to a stripper 1064. The organic effluent of stripper 1064 may optionally be sent back to reactor 1060. Optionally the metal may be removed from a stripping solution in a winner 1066. The stripping solutions may optionally be sent back to the stripper. Alternatively and or additionally there may be other steps for example precipitation.

Other applications that may optionally include a mixing reactor include organic synthesis, desalination of oil, separation of water from organic liquids, chemical synthesis of fuels, metal stripping from an organic phase and/or fuel fertilization, biotechnology processes, and/or other chemical synthesis. In some applications, the solute may be transferred from the organic phase to the aqueous phase.

Retrofitting a Solvent Extraction Plant

Figure 11:
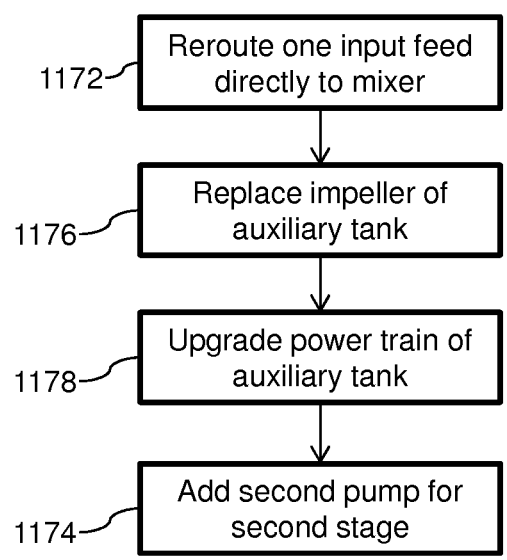
FIG. 11 is a flow chart illustrating a method of retrofitting a solvent extraction plant according to an embodiment of the current invention.

FIG. 11 is a flow chart illustration of a method of retrofitting of an existing solvent extraction plant according to an embodiment of the present invention.

For example in an existing plant two immiscible fluids may be fed into a dispersion apparatus (for example a pump mixer). The dispersion apparatus may combine the fluids (for example by strong agitation) into an emulsion and pump the emulsion into an auxiliary mixer (for example a coalescer). For example the retention time of the dispersion apparatus may be less than 30 sec. The emulsion may be gently agitated in the auxiliary mixture for a relatively long contact time (for example more than 1 minute). In the auxiliary mixer, mass transfer may occur. Effluent from the auxiliary mixer may be sent to a separator.

In some embodiments, the auxiliary mixer may be retrofit to give a reactor that produces a more easily separable emulsion. For example one or more original baffles and/or an original impeller of the auxiliary mixer may be replaced 1176 with an impeller and/or a baffle that produces more even energy dissipation. For example the replacement impeller and/or baffles may be larger than the original impeller and/or baffles (for example as described herein above and/or below). For example the replacement impeller and/or baffles may include rounded edges (for example as described herein above and/or in the example herein below). Replacing a baffle and/or impeller may optionally include adding a new baffle and/or impeller. Replacing a baffle and/or impeller may optionally include removing an existing baffle and/or impeller. Rounded edges may optionally be added to portions of the reactor other than baffles and/or the impeller, especially at sharp edges, locations of high velocity gradients and/or fluid shear. Other changes may be made, for example to reduce shear rates at high shear regions of the reactor and/or to increase the evenness of energy dissipation in the reactor.

In some embodiments, retrofitting may include increasing the average energy dissipation in the auxiliary mixer (for example as described herein above and/or in the examples herein below). For example a larger motor and/or drive train may be added to the auxiliary mixer in order to agitate the auxiliary mixer more strongly.

In some embodiments, retrofitting may include rerouting 1172 one or more of the input feeds directly into the auxiliary mixer such that two or more phases enter the mixer as separate streams and/or as discrete continuous phases in a single stream. Optionally one of the streams may be pumped into the auxiliary mixer with the pump mixer. One or more additional pumps may optionally be added 1174 for pumping additional streams (for example a second pump may be added to pump a second stream) into the auxiliary mixer.

In some embodiments the drive train of the auxiliary mixer may be upgraded 1178. For example a drive train may be replaced and/or added to agitate the tank at a high average power dissipation (for example as described herein above and/or in the example herein below). For example, the auxiliary tank may be agitated with enough power to form an emulsion.

In some embodiments, retrofitting may include rerouting 1172 an input feed directly to the auxiliary mixer. For example, a fluid phase that, in the original plant, was fed into the auxiliary mixer as part of an emulsion, may be fed into the auxiliary mixer of the retrofit plant as a discrete and/or continuous phase.

For example, in some cases, in the original plant, two immiscible phases may be fed into the disperser, formed into an emulsion and the emulsion may be pumped into the auxiliary mixer. In accordance with some embodiments of the present inventions, one or more of the immiscible phases may be input into the auxiliary mixer directly.

Alternatively or additionally, both of the immiscible phases may be input into the auxiliary mixer as discrete phases and/or as continuous phases and/or as discrete phases in a heterogeneous mixture. Alternatively or additionally, a plant may retrofit with some of the above steps. For example, a tank and/or impeller may be replaced 1176 and/or drive train may be upgraded 1178 without rerouting 1172 an input feed.

A Retrofit Solvent Extraction Plant

Figure 12:
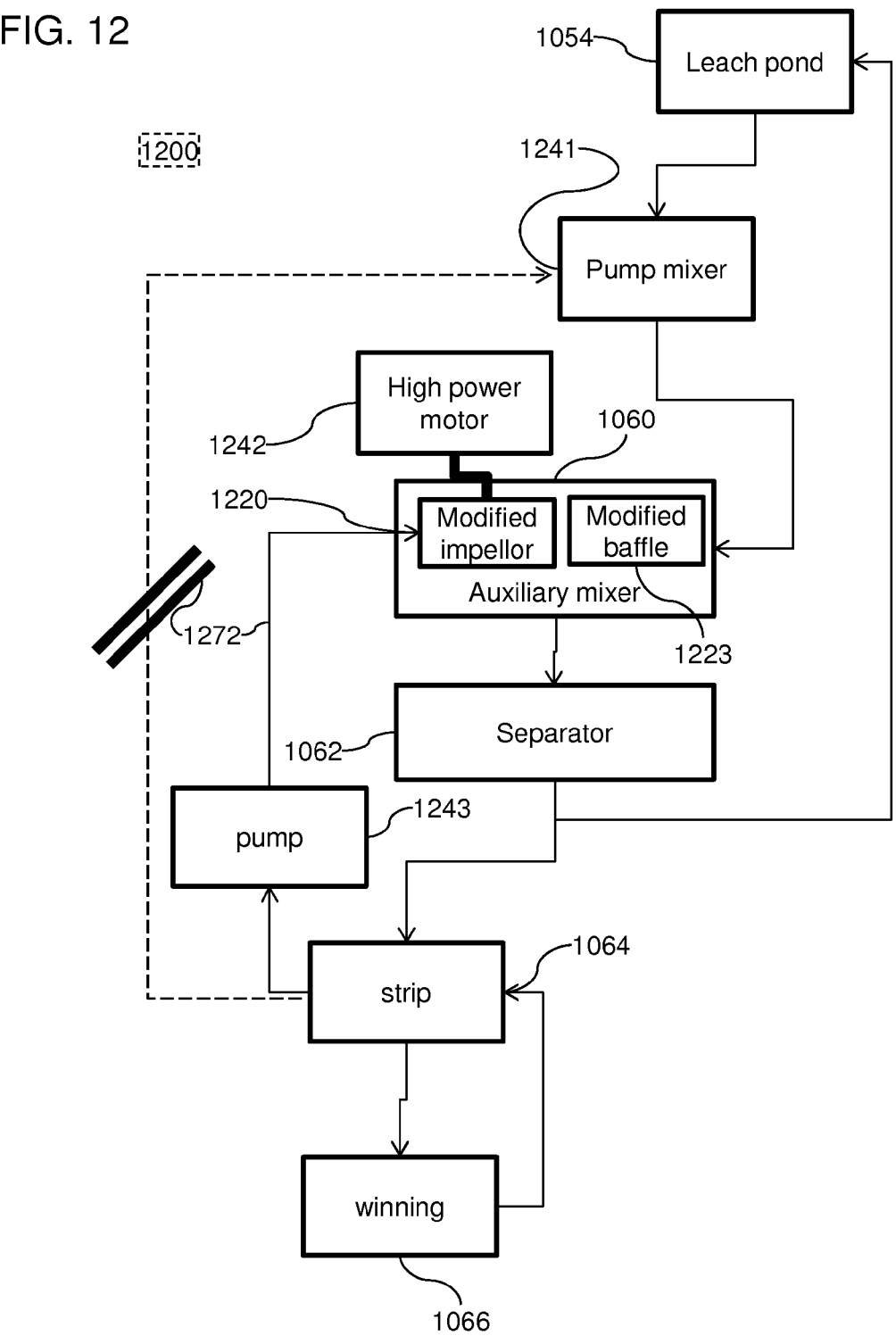
FIG. 12 is a block diagram of a retrofit solvent extraction plant according to an embodiment 1200 of the current invention.

FIG. 12 is a block diagram illustration of retrofit solvent extraction plant according to an embodiment 1200 of the present invention. The retrofit plant, may combine two immiscible fluids in a large auxiliary mixer (for example as described above and/or in examples below) to form an emulsion with improved separability.

In some embodiments of a retrofit plant auxiliary mixer 1060 may be modified, for example to provide higher average energy dissipation and/or to form an emulsion that settle easily (for example as described in any of the embodiments herein above and/or the examples herein below). For example a power train 1242 may be upgraded to provide more power for agitation (for example as described in any of the embodiments herein above and/or the examples herein below). Optionally a modified impeller 1220 may be installed. For example the impeller may be larger and/or have rounded edges (for example as described in any of the embodiments herein above and/or the examples herein below). Alternatively, a modified baffle 1223 may be supplied (for example as described in any of the embodiments herein above and/or the examples herein below).

In some embodiments of a retrofit plant an input feed may be rerouted 1272 to be fed directly into an auxiliary mixer 1060. For example an aqueous stage from a leach pond 1054 and an organic phase from a stripper 1064 may have originally been fed (as shown by the dashed lines in FIG. 12) to a pump mixer 1241, formed into an emulsion and then fed into an auxiliary mixer 1060.

In the retrofit plant according to an embodiment of the present invention, the organic phase of the input feed may be rerouted 1272 directly to the auxiliary mixer as a discrete phase. Rerouting 1272 the organic phase may optionally include adding a pump 1243. Redirecting may for example result in feeding the organic phase as a continuous phase (not mixed into an emulsion with the aqueous phase).

In the retrofit plant according to an embodiment of the present invention, the aqueous phase of the input feed may be pumped into the auxiliary mixer as a discrete phase through the pump mixer. Alternatively or additionally, other phases may be mixed into the system.

Figure 13:
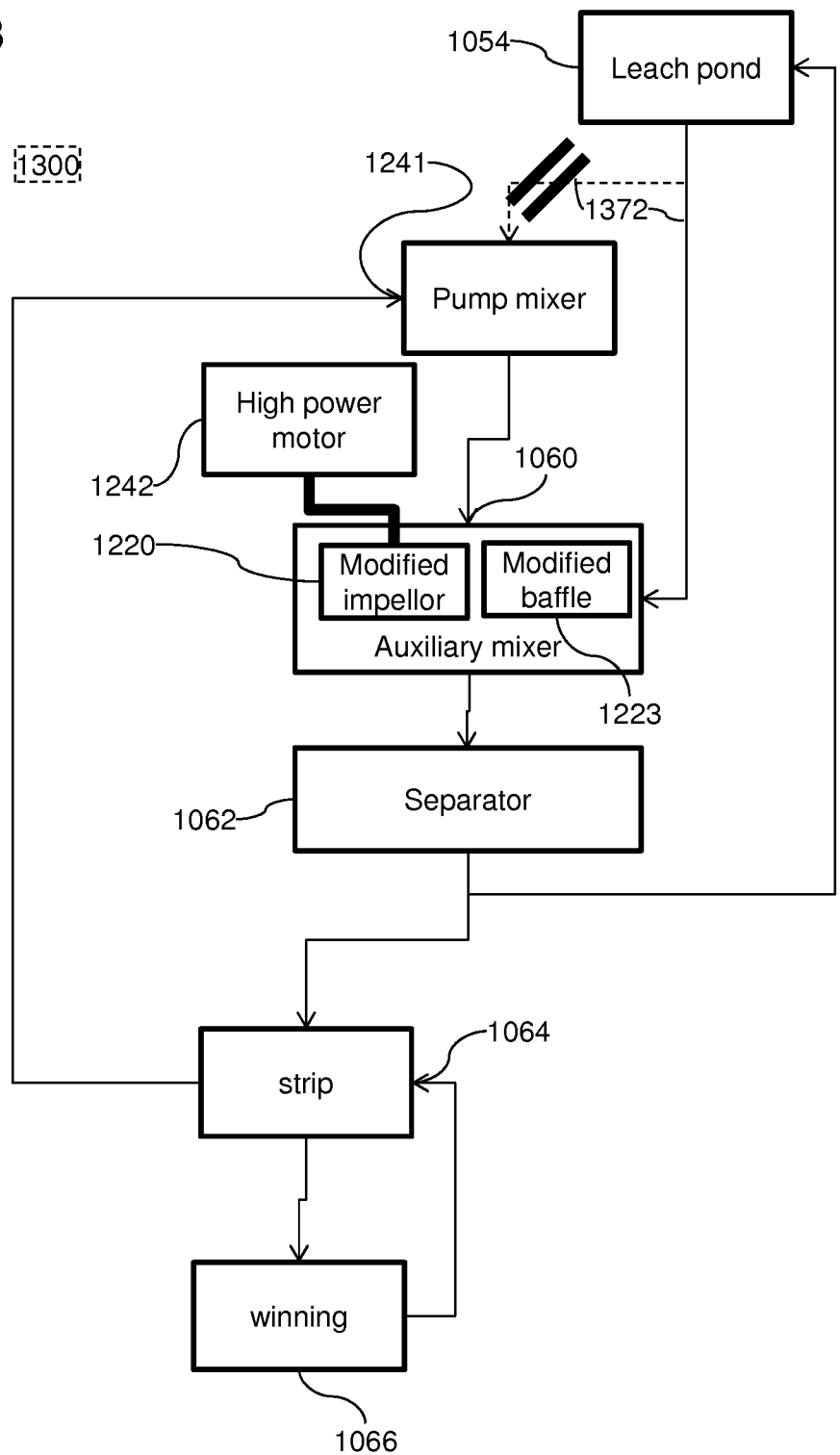
FIG. 13 is a block diagram of a retrofit solvent extraction plant according to an embodiment 1300 of the current invention.

FIG. 13 illustrates an alternative retrofit solute extraction plant according to an embodiment 1300 of the current invention. Embodiment 1300 is similar to the plant of Embodiment 1200. In the embodiment 1300, the organic phase from stripper 1064 is fed into the auxiliary mixer through pump mixer 1241. Optionally in embodiment 1300 the aqueous phase has been rerouted 1372 directly to the auxiliary mixer 1060.

In some embodiments of the current invention, the auxiliary mixer 1060 may be retrofit to mix with a higher average energy dissipation and/or a more even energy dissipation while input feed is an emulsion from the pump mixer (for example similar to the original plant, for example without rerouting 1372 the organic phase). Alternatively or additionally two or more phases may both be rerouted without going through the pump mixer.

Experimental Examples

Various embodiments and aspects of the present invention as delineated hereinabove and as claimed in the claims section below find experimental support in the following examples.

Reference is now made to the following examples, which together with the above descriptions illustrate some embodiments of the invention in a non limiting fashion.

Results of two small scale experiments are summarized in table 1. Referring to the example of table 1, an emulsion of industrial SX fluids was taken from a copper processing plant. The mixture had a continuous aqueous phase and a dispersed organic phase. In the experiment, the mixture was agitated and then separated by gravity settling. The rate of mass transfer was tested by measuring the output concentrations of the solute in the two liquid phases and how far it had gone towards equilibrium. The effectiveness of separation was tested by measuring the residual concentration of the dispersed phase in the aqueous phase after mixing and settling.

In a first experiment, 1.2 l of fluid was first mixed and then separated. In the test reactor, Example 1A, the mixing was performed according to an embodiment of the methodology of the current invention. In the control reactor, Example 1B, the mixing was performed according to conventional methodologies using a hydrofoil impeller. Due in part to scale considerations, a high energy input was used in both reactors in order to keep turbulent flow.

In a second experiment, 80l of fluid was first mixed and then separated. In the test reactor, Example 2A, the mixing was performed according to the methodology of an embodiment of the current invention. In the control reactors, Example 2B and 2C, the mixing was performed according to conventional methodologies using a hydrofoil impeller. Due in part to scale considerations, a high energy input was used in all of the reactors in order to keep turbulent flow.

Experimental parameters and results are shown in Table 1. The mass transfer and phase separation were more efficient using the methodology of embodiments the present invention than using convention mixing.

TABLE 1

| | Small scale experimental parameters and results | | | | |
| --- | --- | --- | --- | --- | --- |
| | 1.2 l vessel | | 80 l vessel | | |
| Example | 1A | 1B | 2A | 2B | 2C |
| Mixing system | Proposed invention | Hydro foil | Proposed invention | Hydro foil | Hydro foil |
| Mixing media volume | 1.2 l | 1.2 l | 80 l | 80 l | 80 l |
| Mixing reactor diameter | 130 mm | 130 mm | 400 mm | 400 mm | 400 mm |
| impeller blade width | 60 mm | Standard | 200 mm | Standard | Standard |
| impeller blade length | 20 mm | Standard | 70 mm | Standard | Standard |
| number of blades k | 4 | | 4 | | |
| pitch of blades α | 60 degrees | | 60 degrees | | |
| rounded diameter at the edge | 8 mm | | 12 mm | | |
| Separation time | 5 min | 10 min | 20 min | 20 min | 20 min |
| Mixing power | 1.8 w | 0.35 w | 64 w | 11 w | 33 w |
| Maximum energy dissipation | 9.7 w/kg | 110 w/kg | 8.5 w/kg | 130 w/kg | 370 w/kg |
| Relative volume impeller zone | 4% | 0.018% | 3.5% | 0.022% | 0.022% |
| Average energy dissipation rate | 1.5 w/kg | 0.3 w/kg | 0.8 w/kg % | 0.18 w/kg | 0.53 w/kg |
| Residence time in the mixing reactor | 60 s | 60 s | 50 s | 50 s | 50 s |
| RESULTS | | | | | |
| Mass transfer efficiency | 97% | 76% | 96% | 72% | 86% |
| Residual oil concentration | 20 ppm | 300 ppm | 16 ppm | 250 ppm | 400 ppm |

Results of pilot scale experiments are summarized in table 2. Referring to the example of table 2, industrial SX fluids were taken from a copper processing plant. The fluids included a discrete aqueous phase, a discrete organic phase and an emulsion of the organic and aqueous phase collected from the output of a pump mixer. In the experiment, the fluids were agitated and then separated by gravity settling. The rate of mass transfer was tested by measuring the output concentrations of the solute in the two liquid phases and how far it had gone towards equilibrium. The effectiveness of separation was tested by measuring the residual concentration of the dispersed phase in the aqueous phase after mixing and settling. In all of the pilot experiments, the volume of the reactor (the auxiliary mixer) was 0.8 $m^3$.

In a first series of experiments 3a-b, both liquids were mixed in the pump mixer to create an emulsion. The emulsion was then agitated in the auxiliary mixer and then separated. In the control reactor, example 3a, the mixing in the auxiliary mixer was performed according to standard procedures using a hydrofoil impeller. In the test reactor, example 3b, the mixing was performed according to an embodiment of the present invention.

In a second series of experiments, example 4a-c, only one discrete phase liquid was fed into the pump mixer while the second discrete phase liquid was fed directly into auxiliary mixer. After agitation in the auxiliary mixer, the output was fed into a separator to separate the discrete phases.

In example 4a, the mixing in the auxiliary mixer was performed according to the methodology of an embodiment of the current invention. In the control reactors, in examples 4b and 4c, the mixing was performed according to conventional methodologies using a hydrofoil impeller. In example 4c a high energy input was used in order to create emulsion with standard impeller.

Experimental parameters and results are shown in Table 1. In experiment 3a, the conventional methodology gave conventional results that a long separation time (20 minutes) was needed to get reasonable phase separation (80-150 ppm organic entrainment in the separated aqueous phase). In experiment 3b, the TT embodiment of the agitation methodology of the present invention resulted in better phase separation (25-50 ppm organic entrainment in the separated aqueous phase) with shorter separation time (5 min) than conventional agitation. In experiment 4a, the TT embodiment of the agitation methodology of the present invention was strong enough to form an emulsion without an addition premixing stage (for example using a disperser such as a pump mixer). Furthermore the emulsion formed directly by the TT embodiment of the present invention had better phase separation (12-22 ppm organic entrainment in the separated aqueous phase) with the short separation time (5 min) than any of the other experiments.

In experiment 4b, standard agitation failed to form an emulsion without a pump mixer. In experiment 4c, standard agitation with high energy dissipation produced an emulsion without premixing, but the resulting emulsion had poor phase separation (140-480 ppm organic entrainment in the separated aqueous phase) with long separation time (20 min) The conclusion is that mass transfer and phase separation may be more efficient using some embodiments of the methodology of the present invention than using convention mixing.

TABLE 2

Pilot scale experimental parameters and results

| Parameter | Value | | | | |
|---|---|---|---|---|---|
| Trial number | 3a | 3b | 4a | 4b | 4c |
| Feed to mixer | Feed emulsion from pump mixer | Feed emulsion from pump mixer | Separate feed of phases | Separate feed of phases | Separate feed of phases |
| Mixing system | Standard Hydrofoil | TT mixing system: | TT mixing system: | Standard Hydrofoil | Standard Hydrofoil |
| Rotation speed | 140 rpm | 90 rpm | 90 rpm | 140 rpm | 250 rpm |
| Mixing media volume | 0.8 $m^3$ | 0.8 $m^3$ | 0.8 $m^3$ | 0.8 $m^3$ | 0.8 $m^3$ |
| Mixing reactor diameter | 900 mm | 900 mm | 900 mm | 900 mm | 900 mm |
| Impeller Diameter | 450 mm | 460 mm | 460 mm | 450 mm | 450 mm |
| impeller blade width | Standard | 250 mm | 250 mm | Standard | Standard |
| impeller blade length | Standard | 180 mm | 180 mm | Standard | Standard |
| number of blades k | 4 | 8 in two levels | 8 in two levels | 4 | 4 |
| pitch of blades α | Standard | 60 degrees | 60 degrees | Standard | Standard |
| rounded edge diameter | Edge - not rounded | 50 mm | 50 mm | Edge - not rounded | Edge - not rounded |
| Separation time | 20 min | 5 min | 5 min | 20 min | 20 min |
| Mixing power | 75 w | 665 w | 665 w | 75 w | 420 w |
| Maximum energy dissipation | 50 w/kg | 11 w/kg | 11 w/kg | 50 w/kg | 280 w/kg |
| impeller zone Volume | 0.22 l | 32.5 l | 32.5 l | 0.22 l | 0.22 l |
| Average energy dissipation rate | 0.085 w/kg | 0.75 w/kg | 0.75 w/kg | 0.085 w/kg | 0.48 w/kg |
| Energy dissipation rate in the bulk of volume | 0.032 w/kg | 0.4 w/kg | 0.4 w/kg | 0.032 w/kg | 0.18 w/kg |
| Residence time in the pump mixer | 30 s | 30 s | 30 s | 30 s | 30 s |
| Residence time in the Auxiliary mixer | 1 min | 1 min | 1 min | 1 min | 1 min |
| Organic entrainment in aqueous phase | 80-150 ppm | 25-50 ppm | 12-22 ppm | No emulsion created. No extraction | 140-480 ppm |

General

It is expected that during the life of a patent maturing from this application many relevant mixing and separation technologies will be developed and the scope of the terms impeller, reactor, mixing, mixture, separator, and separation are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

For non circular vessels, the radius means the hydraulic radius and the diameter means the hydraulic diameter.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of solute extraction, the method comprising:
rotating an impeller so as to mix a first liquid and a second liquid in a reactor vessel said mixing at an average energy dissipation rate of at least 0.3 W/Kg and less than 20 W/Kg so that after the mixing an emulsion of the first and second liquids is present in the reactor vessel; said mixing of said first and second liquids continuing long enough to transfer at least some of said solute from said first liquid to said second liquid in said emulsion, wherein the mixing is performed so that:
   i. a volume of said reactor having a local energy dissipation rate of between 2 to 20 W/Kg is at least 1%;
   ii. a volume of said reactor having a local energy dissipation rate of greater than 20 W/kg is less than 0.01%; and
   iii. said impeller has a blade width W a blade length L and a blade number k such that the product of said length squared and said width and said blade number is greater than 2.0% of the volume of said reactor.

2. The method of claim 1, wherein
said rotating of said impeller imparts a tip speed v to said impeller said tip speed v obeying the relation $4\ m^2s^{-3} \leq 0.3v^3 \sin^2(\alpha)/B \leq 20\ m^2s^{-3}$ where $\alpha$ is a pitch of a blade of said impeller and B is the maximum of length (L) of said blade and width (W) a of said blade, B=max[L, W].

3. The method of claim 1, further comprising:
recovering from an output of said mixing reactor a portion of said second liquid including at least some of said solute; said recovering having an additional residence time of less than 15 minutes after said mixing of said portion of said second liquid.

4. The method of claim 3, wherein said recovered portion of said second liquid includes less than 75 ppm of said first liquid.

5. The method of claim 1, further comprising:
feeding of a continuous phase of said second liquid to said reactor vessel.

6. The method of claim 5, further comprising:
introducing of a continuous phase of said first liquid into said reactor.

7. The method of claim 1, wherein said mixing continues for between 50 sec and 600 sec.

8. A method of solute extraction, the method comprising:
rotating an impeller so as to mix a first liquid and a second liquid in a reactor vessel said mixing at an average energy dissipation rate of at least 0.3 W/Kg and less than 20 W/Kg so that after the mixing an emulsion of the first and second liquids is present in the reactor vessel; said mixing of said first and second liquids continuing long enough to transfer at least some of said solute from said first liquid to said second liquid in said emulsion, wherein said rotating of said impeller imparts a tip speed v to said impeller said tip speed v obeying the relation $4\ m^2s^{-3} \leq 0.3v^3 \sin^2(\alpha)/B \leq 20\ m^2s^{-3}$ where α is a pitch of a blade of said impeller and B is the maximum of length (L) of said blade and width (W) a of said blade, B=max[L, W], and wherein said impeller has a blade width W a blade length L and a blade number k such that the product of said length squared and said width and said blade number is greater than 2.0% of the volume of said reactor.

* * * * *